United States Patent
Robuck et al.

(10) Patent No.: US 9,938,004 B2
(45) Date of Patent: Apr. 10, 2018

(54) BEARING APPARATUS FOR POWER TRANSMISSIONS

(71) Applicant: The Boeing Company, Chicago, IL (US)

(72) Inventors: Mark J. Robuck, Chadds Ford, PA (US); Eric Kaiser, Media, PA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 14/714,911

(22) Filed: May 18, 2015

(65) Prior Publication Data
US 2016/0341283 A1   Nov. 24, 2016

(51) Int. Cl.
*F16H 1/32*   (2006.01)
*B64C 27/14*   (2006.01)

(52) U.S. Cl.
CPC .................................. *B64C 27/14* (2013.01)

(58) Field of Classification Search
CPC ....................................................... F16H 1/321
See application file for complete search history.

(56) References Cited

U.S. PATENT DOCUMENTS

| | | | | |
|---|---|---|---|---|
| 3,590,659 A | * | 7/1971 | Maroth | F16H 23/00 475/164 |
| 4,392,395 A | * | 7/1983 | Clarke | F16H 15/00 475/190 |
| 4,620,456 A | * | 11/1986 | Distin | F16H 1/321 475/164 |
| 4,620,457 A | * | 11/1986 | Distin | F16H 1/321 475/164 |
| 5,443,428 A | * | 8/1995 | April | F16H 25/06 475/163 |
| 6,348,021 B1 | * | 2/2002 | Lemanski | F16H 3/70 475/164 |
| 6,764,423 B2 | | 7/2004 | Lemanski | |
| 7,147,583 B2 | | 12/2006 | Lemanski | |
| 7,507,180 B2 | | 3/2009 | Robuck | |
| 9,765,853 B2 | | 9/2017 | Robuck et al. | |

(Continued)

FOREIGN PATENT DOCUMENTS

EP    2674358    12/2013

OTHER PUBLICATIONS

United States Patent and Trademark Office, "Non-Final Office Action", issued in connection with U.S. Appl. No. 14/714,895, dated Dec. 16, 2016 (40 pages).

(Continued)

*Primary Examiner* — Tisha D Lewis
(74) *Attorney, Agent, or Firm* — Hanley, Flight & Zimmerman, LLC

(57) ABSTRACT

A transmission includes a first pericyclic motion converter having a first aperture to receive at least a portion of an output shaft and a second pericyclic motion converter having a second aperture to receive at least a portion of the output shaft. A first bearing is positioned between an inner surface of the first pericyclic motion converter defined by the first aperture and an outer surface of the output shaft. A second bearing is positioned between an inner surface of the second pericyclic motion converter defined by the second aperture and the outer surface of the output shaft.

24 Claims, 14 Drawing Sheets

(56) References Cited

U.S. PATENT DOCUMENTS

2015/0087462 A1    3/2015  Muller et al.

OTHER PUBLICATIONS

United States Patent and Trademark Office, "Final Office Action," issued in connection with U.S. Appl. No. 14/714,895, dated Apr. 21, 2017, 29 pages.

Froede, Erick W., "Computer Aided Design, Simulation and Transmission Error Analysis of a Face Gear Pair," published Aug. 2013, 137 pages, available from: http://www.erickfroede.com/uploads/1/1/7/3/11733894/erick_froede_thesis_final.pdf, last retrieved on May 15, 2015.

United States Patent and Trademark Office, "Notice of Allowance," issued in connection with U.S. Appl. No. 14/714,895, dated May 18, 2017, 32 pages.

* cited by examiner

I # BEARING APPARATUS FOR POWER TRANSMISSIONS

FIELD OF DISCLOSURE

The present disclosure relates generally to transmissions and, more particularly, to bearing apparatus for power transmissions.

BACKGROUND

Power transmissions are often employed with drive systems to transfer power between an actuator or motor and an output shaft. For example, the rotary actuators transfer power from a rotary actuator or moving element to an output shaft. In some examples, rotary wing aircraft (e.g., helicopters) employ a rotor or output driven by an engine or input via a drive system. A drive system typically employs a transmission (e.g., a gearbox) that transfers power between an engine and the rotor. In some instances, the transmission also provides speed and/or torque varying functionality (e.g., increasing or decreasing between input and output). A transmission of rotary wing aircraft often has a relatively large dimensional envelope or footprint and/or weight. In some instances, the transmission is often the heaviest subsystem in a drive system of an aircraft.

SUMMARY

An example disclosed rotor assembly includes a first pericyclic motion converter having a first aperture to receive at least a portion of an output shaft and a second pericyclic motion converter having a second aperture to receive at least a portion of the output shaft. A first bearing is positioned between an inner surface of the first pericyclic motion converter defined by the first aperture and an outer surface of the output shaft. A second bearing is positioned between an inner surface of the second pericyclic motion converter defined by the second aperture and the outer surface of the output shaft.

An example disclosed apparatus includes a first pericyclic motion converter and a second pericyclic motion converter. A carrier supports the first and second pericyclic motion converters. The carrier has a first bearing mounting surface, a second bearing mounting surface, a third bearing mounting surface and a fourth bearing mounting surface. The first bearing mounting surface is spaced from the second bearing mounting surface, the third bearing mounting surface is spaced from the fourth bearing mounting surface, and the first and second bearing mounting surfaces to oppose the third and fourth bearing mounting surfaces relative to a longitudinal axis of the carrier. A first distance between the first bearing mounting surface and the second bearing mounting surface is greater than a second distance between the third bearing mounting surface and the fourth bearing mounting surface.

An example transmission disclosed apparatus includes a first pericyclic motion converter and a second pericyclic motion converter. A carrier is positioned between the first pericyclic motion converter and the second pericyclic motion converter. The carrier defines a web between a peripheral edge of the carrier and an opening to receive an output shaft. A first roller assembly protrudes from the web. The first roller assembly has a first roller to engage the first pericyclic motion converter and a second roller to engage the second pericyclic motion converter.

The features, functions and advantages that have been discussed can be achieved independently in various embodiments or may be combined in yet other embodiments further details of which can be seen with reference to the following description and drawings.

Figure 1:
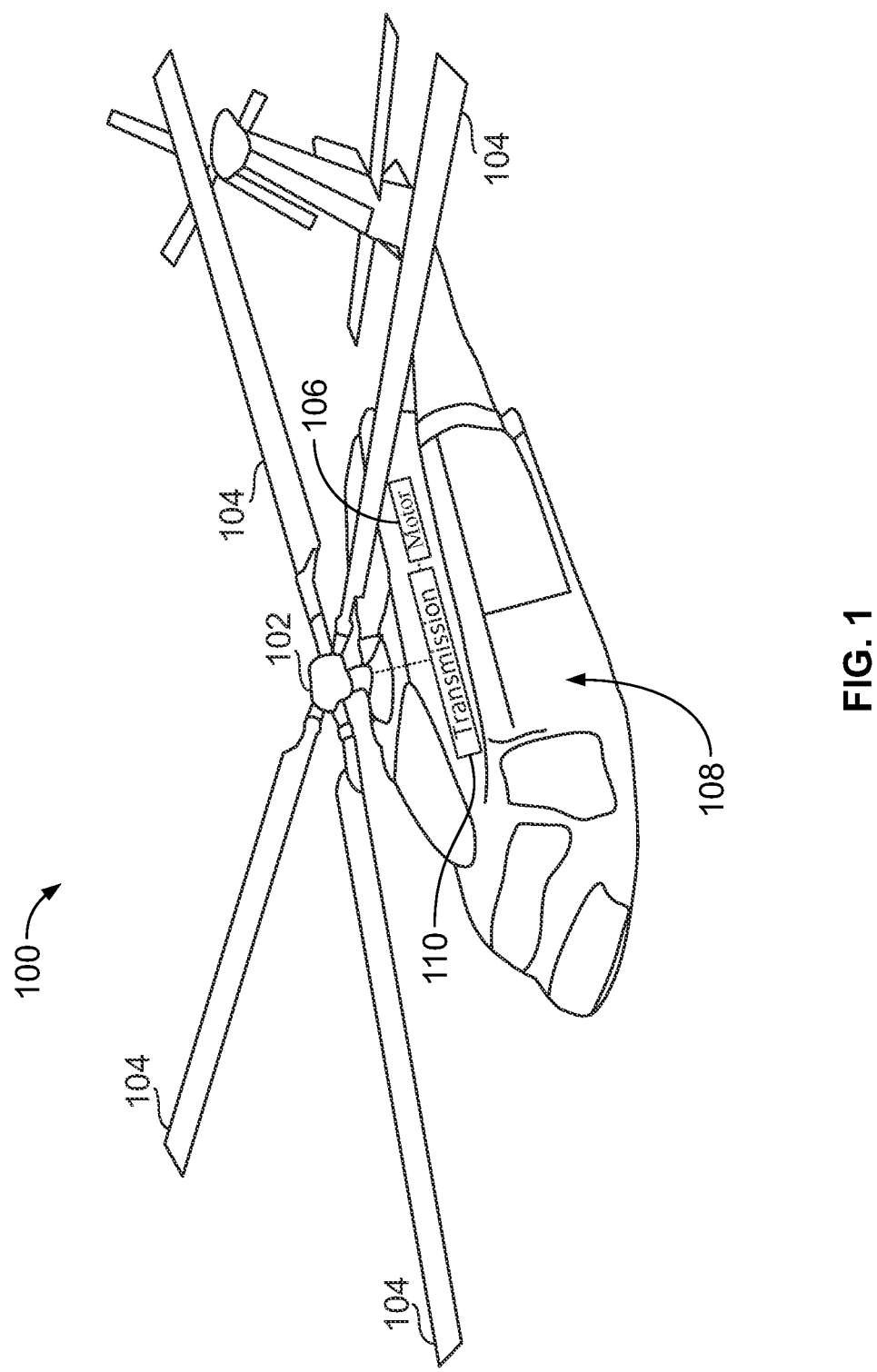
FIG. 1 is an illustration of an example rotorcraft in which teachings of this disclosure may be implemented.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. As used herein, the terms "coupled" and "operatively coupled" are defined as connected directly or indirectly (e.g., through one or more intervening structures and/or layers). Stating that any part is in contact with or enmeshed with another part means that there is no intermediate part between the two parts.

DESCRIPTION

To reduce and/or minimize dimensional profile and/or weight, some variable speed transmissions employ a Pericyclic Mechanical Transmission (PMT). A pericyclic mechanical transmission (PMT) has a nutating drive mechanism that provides a compact dimensional profile and/or weight while providing a high reduction ratio (e.g., torque and/or speed reduction ratio) and/or high tooth contact ratio.

For example, pericyclic mechanical transmissions allow for high power density, high speed reduction ratios (e.g., 10:1, 20:1, 50:1) and allow for minimal part count to provide a compact design. Some example pericyclic transmissions include a nutating and/or rotating gear mechanism that has meshing conjugate face gear pairs (e.g., beveloid gears, spur bevel gears, etc.). More specifically, the pericyclic mechanical transmission is a gear train system based on pericyclic motion and advanced meshing conjugate face gear pair geometries and is often described as a synthesis of rotation, nutation and oscillation. A face gear is a gear having radially cut teeth around an interior perimeter of the gear. A face gear, for example, can mate or enmesh with a spur pinion in either an intersected or offset axis configuration. A face gear enables torque to be split in a transmission while having relatively low misalignment sensitivity. Example pericyclic mechanical transmissions are described in U.S. Pat. No. 6,348,021, U.S. Pat. No. 6,764,423, and U.S. Pat. No. 7,147,583, which are hereby incorporated herein by reference in their entities.

Although pericyclic mechanical transmissions can be used in high power, high velocity applications, known pericyclic mechanical transmissions have not been deemed weight efficient and/or practical for power transmission applications such as, for example, in rotorcraft applications. In particular, known nutating and/or pericyclic mechanisms employ differential gear components that generate large forces and/or moments (e.g., large gear separating forces and/or tangential forces) that must be transmitted through bearings and housings. Large forces carried through these components tend to make the device impractical because the components must be sized and configured to withstand the large forces imparted. For example, to configure a pericyclic transmission for use with a rotorcraft application, gear reduction loads are relatively large, which results in bearing sizes that are significantly larger than the gears they support. These large bearings ultimately result in transmissions that are too heavy and/or too large for certain applications. Additionally, sizing the bearings to sustain these loads may be impractical given the spatial requirements and/or limitations of rotor drive systems.

Unlike some known rotary aircraft variable speed transmissions (e.g., epicyclic gear transmissions), the example power transmissions disclosed herein employ pericyclic mechanical transmissions. The example power transmissions (e.g., variable speed transmissions) disclosed herein employ bearing apparatus and/or face gear configurations that result in load reduction or cancellation of gear forces and/or moments imparted to pericyclic motion converters of the pericyclic transmission. In particular, the example bearing apparatus and/or face gear configurations disclosed herein are advantageous for absorbing, reducing and/or eliminating loads generated by nutating and/or pericyclic transmissions. For example, the apparatus disclosed herein help absorb, cancel and/or reduce loads and/or forces imparted to components such as pericyclic motion converters of a transmission, thereby reducing weight and/or a dimensional envelope of other components of the drive system. For example, the gear orientation and/or positioning (e.g., of the example pericyclic motion converters disclosed herein) cause forces or moments (e.g., separating gear forces and/or tangential forces) to act in opposing directions, thereby reducing a net magnitude of forces and/or moments imparted on gear components of the transmission and, thus, the net loads and/or moments imparted to support bearings and/or components of the transmission. The example transmission disclosed herein may employ pericyclic motion converters that are configured to enmesh with reaction control members and/or output shaft gears at multiple points of contact and/or locations to provide load cancellation and/or load reductions.

As a result of providing bearing apparatus and/or gear orientations to reduce loads and/or moments imparted to the transmissions, the transmissions disclosed herein may be have a smaller dimensional profile, envelope or footprint than many known transmissions to enable the example transmissions to be used with a drive system of an aircraft (e.g., a rotary wing aircraft). Additionally, the example power transmissions disclosed herein significantly reduce weight while maintaining efficiency and reliability of a transmission.

Although the examples disclosed herein are described in connection with pericyclic transmissions, some of the examples disclosed herein may be employed with transmissions such as, for example, epicyclic transmissions and/or any other suitable transmission systems. Further, although the example transmissions disclosed herein are disclosed in connection with rotorcraft drive systems, the example transmissions disclosed herein may be implemented with other aircraft or vehicle drive systems, automobile transmissions, machinery drive systems or transmissions, and/or any other drive system(s). For example, the example transmissions disclosed herein may implement rotary actuators. For example, some aircraft employ rotary actuators to operate movement of flaps (e.g., wing flaps), cargo doors, and/or other aircraft components.

FIG. 1 shows an example machine in which example methods and apparatus disclosed herein may be utilized. For example, FIG. 1 illustrates a rotary wing aircraft 100 (e.g., a helicopter) constructed in accordance with the teachings of this disclosure. The example rotary wing aircraft 100 of the illustrated example is a single rotor aircraft. However, in other examples, an example rotary wing aircraft may be a double rotor aircraft. Further, while example apparatus disclosed herein are described in connection with FIG. 1, examples disclosed herein may be implemented in connection with any type of machine or device having rotor blades, such as aircraft, watercraft, hovercraft, wind turbines, pumps, and/or any other machine or device.

FIG. 1 shows a rotary wing aircraft 100 (e.g., a helicopter) having a rotor system 102 that drives a plurality of rotor blades 104. The rotor system 102 spins the rotor blades 104 to provide the rotary wing aircraft 100 with lift and thrust. An engine 106 (e.g., a gas turbine engine) drives the rotor system 102 via a drive system 108. The drive system 108 reduces a high rotation speed or input from the engine 106 to provide a reduced or low speed output needed to drive the rotor system 102. For example, the drive system 108 of the illustrated example provides a speed reduction ratio (e.g., 10:1, 20:1, 50:1; a ratio approximately between 10:1 and 50:1, etc.) between the input speed provided by the engine 106 and the output speed provided to the rotor system 102. To provide a reduced speed output, the drive system 108 of the illustrated employs a transmission 110. For example, the transmission 110 may employ a nutating and/or pericyclic mechanism.

Example transmissions disclosed herein, such as the transmission 110 of FIG. 1, reduce an overall dimensional footprint and/or envelope of a drive system (e.g., the drive system 108), which eliminates and/or significantly reduces space issues often associated with rotary drive systems. Additionally, the example transmissions disclosed herein reduce weight, complexity, cost, and reliability issues associated with known transmissions often employed with a rotary wing aircraft. For example, some example transmissions disclosed herein provide load cancellations and/or alleviated net loads transferred to components (e.g., bearings, housing, output shafts, etc.) of the transmission system based on bearing apparatus and configurations and/or gear orientation (e.g., pericyclic gear and/or face gear orientations). In particular, for example, bearing apparatus and/or face gear orientations of pericyclic motion converters disclosed herein reduce and/or cancel certain loads (e.g., tangential loads, radial loads, face gear separating loads, moments, etc.) instead of the loads being reacted into bearings and/or structures of the pericyclic transmission. Some example transmissions disclosed herein reduce and/or cancel relatively large tangential loads that are imposed on a pericyclic motion converter of the transmission, thereby enabling a significant size reduction of the pericyclic motion converter, bearings and/or the components and/or structure of the example transmissions. Some example transmissions disclosed herein such as the transmission 110 of FIG. 1 include one or more bearing apparatus and/or support bearings to absorb and/or reduce large forces generated by differential gear components (e.g., a nutating and/or pericyclic mechanism) of the transmission 110. Some example transmissions disclosed herein such as the transmission 110 of FIG. 1 employ a gear orientation (e.g., face gear orientation) pattern to absorb and/or reduce large forces generated by differential gear components (e.g., a nutating and/or pericyclic mechanism) of the transmission 110. Some example transmissions disclosed herein employ a combination of gear orientation (e.g., face gear orientation) and bearing apparatus and/or support bearings to absorb, eliminate and/or reduce certain forces and/or moments imparted to components of the example transmissions disclosed herein. Details and advantages of example transmissions disclosed herein that may implement the example transmission 110 of FIG. 1 are provided below in connection with FIGS. 2-14.

However, as noted above, the example transmission apparatus of FIGS. 2-14 may implement rotary actuators and/or other actuators or transmission apparatus.

Figure 2:
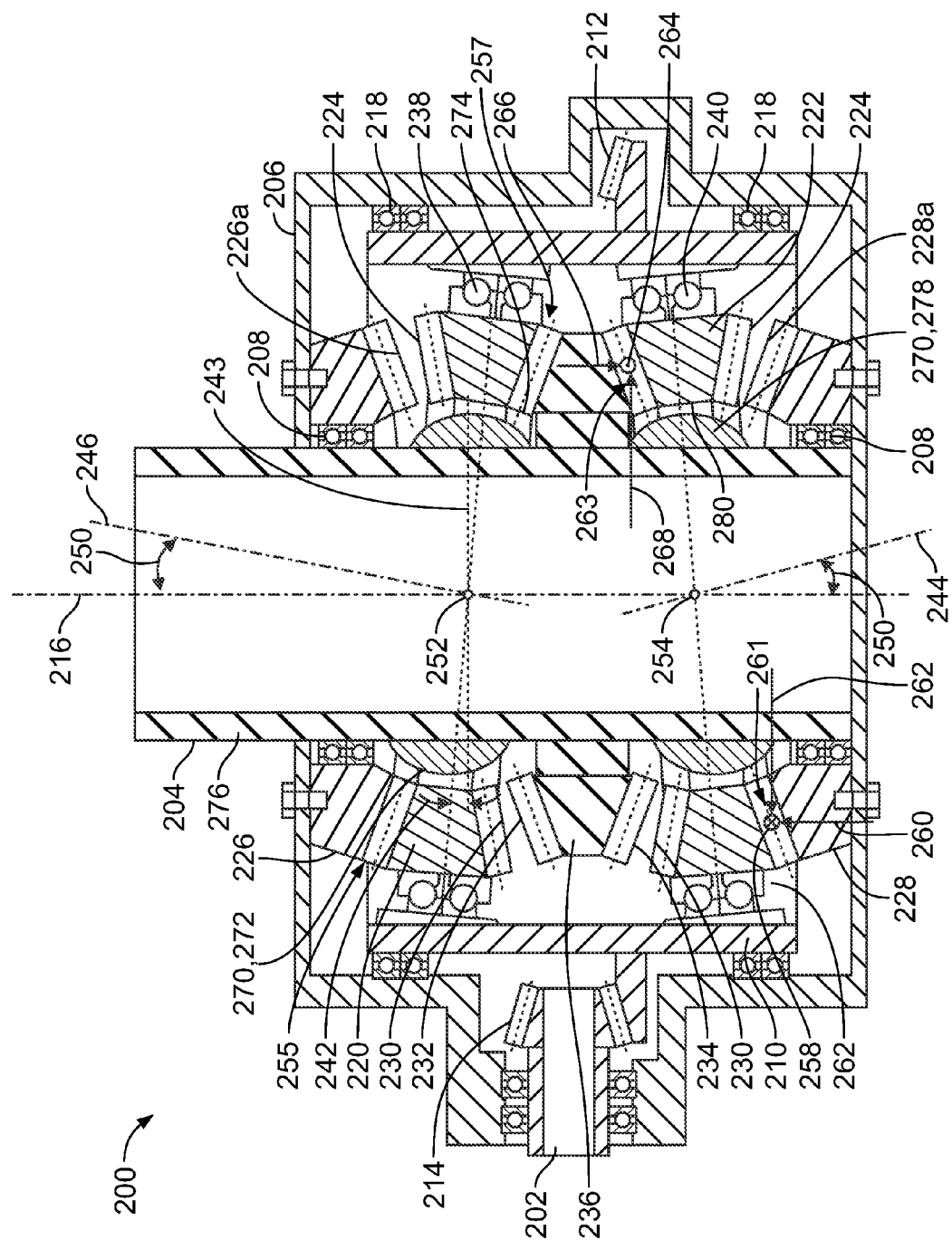
FIG. 2 illustrates an example transmission having an example bearing apparatus constructed in accordance with the teachings of this disclosure.

FIG. 2 depicts an example transmission 200 constructed in accordance with the teachings of this disclosure. The example transmission 200 of FIG. 2 may be used to implement the transmission 110 of FIG. 1, rotary actuators and/or any other transmission or actuator mechanism employing pericyclic motion. The example power transmission 200 of the illustrated example receives power via an input shaft 202 operatively coupled to an engine (e.g., the engine 106 of FIG. 1) and an output shaft 204 to drive an output member such as, for example, the rotor system 102 of the example aircraft of FIG. 1. Specifically, the transmission 200 reduces speed from the input shaft 202 to the output shaft 204, while increasing a torque from the input shaft 202 to the output shaft 204. The transmission 200 includes a housing 206 to house or receive the input shaft 202 and the output shaft 204. The transmission 200 includes output shaft bearings 208 to journal the output shaft 204 for rotation relative to the housing 206 and/or to support or maintain the output shaft 204 relative to the housing 206. To drive the output shaft 204 via the input shaft 202 (e.g., an input shaft 302 of FIG. 3), the transmission 200 employs a carrier 210. The carrier 210 includes a peripheral gear 212 to engage an input gear 214 of the input shaft 202. The carrier 210 rotates relative to the housing 206 about an axis of rotation or rotational axis 216 coaxial with the axis of rotation 216 of the output shaft 204. To rotatably support and/or fix the rotational axis of the carrier 210 relative to the housing 206, the transmission 200 includes carrier bearings 218 between an outer surface of the carrier 210 and an inner surface of the housing 206. To transfer power (e.g., reduce speed and/or increase torque) from the carrier 210 to the output shaft 204, the transmission 200 employs pericyclic motion converters 220 and 222 (e.g., upper and lower pericyclic motion converters, etc.). As shown in FIG. 2, the pericyclic motion converters 220 and 222 each have a first face gear 224 to engage or enmesh with respective reaction control members 226 and 228 coupled (e.g., fixed) to the housing 206 and a second face gear 230 to engage respective first and second face gears 232 and 234 of an output shaft gear 236 coupled (e.g., fixed) to the output shaft 204. In other words, the first face gears 224 of the first and second pericyclic motion converters 220 and 222 oppose the second face gears 230 of the respective first and second pericyclic motion converters 220 and 222. Although the example gears 224 and 230 are illustrated as face gears, the example gears 224 and 230 may be bevel gears and/or any other suitable gear.

The pericyclic motion converters 220 and 222 of the illustrated example are supported and/or journalled for rotation with respect to the output shaft 204, the carrier 210 and/or the housing 206 via respective support bearings 238 and 240. In particular, the support bearings 238 and 240 are angled or tilted relative to the axis 216 of the carrier 210. For example, each of the support bearings 238 and 240 is positioned, canted or mounted on the carrier 210 at nutation angle 242 relative to a reference or horizontal axis 243 and/or the longitudinal axis 216 of the output shaft 204. As a result of the positioning of the support bearings 238 and 240 at the nutation angles 242, each of the pericyclic motion converters 220 and 222 rotates relative to a respective rotational axis 244 and 246 that is at an angle 250 (e.g., between approximately 1 and 6 degrees) relative to the rotational axis 216 of the carrier 210 and/or the output shaft 204. Additionally, as the pericyclic motion converters 220 and 222 rotate or spin about the respective axes 244 and 246, the support bearings 238 and 240 impart and/or initiate a nutating motion to the pericyclic motion converters 220 and 222 causing each of the pericyclic motion converters 220 and 222 to wobble (e.g., about plus or minus 5 degrees) about respective wobble center points 252 and 254. As a result, the pericyclic motion converters 220 and 222 follow the wobbling motion directed by the support bearings 238 and 240 while rotating relative to the support bearings 238 and 240. In some examples, as the pericyclic motion converters 220 and 222 wobble about the respective wobble center points 252 and 254, the angle 250 between the axis of rotational axis 216 and the respective rotational axes 244 and 246 is maintained.

In operation, the input gear 214, driven via the input shaft 202, drives the carrier 210 via engagement with the peripheral gear 212 of the carrier 210. In turn, the carrier 210 rotates about the axis 216 relative to the output shaft 204. As the carrier 210 rotates about the axis 216, the carrier 210 causes the pericyclic motion converters 220 and 222 to rotate about the respective rotational axes 244 and 246 via the support bearings 238 and 240. Additionally, the support bearings 238 and 240 impart a wobbling motion to the pericyclic motion converters 220 and 222 causing the pericyclic motion converters 220 and 222 to wobble relative to the rotational axis 216 about the respective wobble center points 252 and 254 as the pericyclic motion converters 220 and 222 spin about the respective axes of rotation 244 and 246. Specifically, the pericyclic motion converters 220 and 222 wobble about a circumference of the reaction control members 226 and 228 and/or the output shaft gear 236 during operation. As a result of mounting the pericyclic motion converters 220 and 222 at the nutation angle 242, the pericyclic motion converter 220 and 222 are always in mesh with portions of both the reaction control members 226 and 228 and the output shaft gear 236 and out of mesh or disengaged from other portions of both the reaction control members 226 and 228 and the output shaft gear 236. Further, because the reaction control members 226 and 228 are fixed, the transmission 200 has a fixed reduction ratio.

For example, as the pericyclic motion converters 220 and 222 rotate about the respective axes 244 and 246 and/or wobble relative to the respective wobble center points 252 and 254, the pericyclic motion converters 220 and 222 engage or enmesh with the reaction control members 226 and 228 and the output shaft gear 236 to produce rotation of the output shaft 204 (e.g., at a reduced rate of speed compared to a rate of speed of the input gear 214). More specifically, the first face gear 224 of the pericyclic motion converter 220 engages or enmeshes with a face gear 226a of the reaction control member 226 to provide a first gear mesh 255 and the second face gear 230 of the pericyclic motion converter 220 engages or enmeshes with the first face gear 232 of the output shaft gear 236 to provide a second gear mesh 257. Similarly, the first face gear 224 of the pericyclic motion converter 222 engages or enmeshes with a face gear 228a of the reaction control member 228 to provide a third gear mesh 261 and the second face gear 230 of the pericyclic motion converter 222 engages or enmeshes with the second face gear 234 of the output shaft gear 236 to provide a fourth gear mesh 263. In particular, as shown in FIG. 2, only a portion or segment (e.g., a pre-determined number of gear teeth, 10 gear teeth, etc.) of the first face gear 220 of the pericyclic motion converters 220 and 222 engage with the respective reaction control members 226 and 228 and only a portion or segment (e.g., a pre-determined number of gear teeth, 10 gear teeth, etc.) of the second face gear 230 of the pericyclic motion converters 220 and 222 engage or enmesh with the respective first and second faces gears 232 and 234 of the output shaft gears 236 as the pericyclic motion converters 220 and 222 rotate relative to the rotational axes 244 and 246 and/or wobble relative to the wobble center points 252 and 254.

During operation, engagement between the pericyclic motion converters 220 and 222 with the reaction control members 226 and 228 (e.g., the gear meshes 255 and 257) and the face gears 232 and 234 of the output shaft gear 236 (e.g., the gear meshes 261 and 263) produce (e.g., tooth mesh loads) reaction loads, moment loads, axial or lateral mesh loads, radial or face gear separating loads and/or tangential forces or loads that may be imparted to the support bearings 238 and 240, the carrier bearings 218, the output shaft bearings 208 and/or the housing 206. For example, the gear meshes 255 and 261 (e.g., at a point of contact between gear teeth of the first face gears 224 of the pericyclic motion converters 220 and the gear teeth of the face gears 226a and 228a of the respective reaction control members 226 and 228) produce tangential loads 258 (work generating forces in a direction into the paper in the orientation of FIG. 2), axial loads 260 (e.g., thrust loads) and radial loads 262 (e.g., face gear separating loads) that may be reacted through and/or or imparted to the support bearings 238 and 240. Similarly, the gear meshes 257 and 263 (e.g., at a point of contact between gear teeth of the second face gears 230 of the pericyclic motion converters 220 and 222 and gear teeth of the respective first and second face gears 232 and 234 of the output shaft gear 236) produce tangential loads 264 (in a direction out of the figure in the orientation of FIG. 2), axial loads 266 and radial loads 268 that may be reacted through and/or imparted to the support bearings 238 and 240. Example loads and/or moments generated are discussed in more detail in connection with FIGS. 3 and 4.

To react, absorb, reduce, take up, eliminate and/or otherwise alleviate loads (e.g., moment loads 302 (FIG. 3), 408 and 410 (FIG. 3), tangential loads 258, 264, axial loads 260, 266, radial loads 262, 268, etc.) imparted to the respective support bearings 238 and 240, the transmission 200 employs a bearing apparatus 270. In the illustrated example, the bearing apparatus 270 includes a first bearing 272 positioned between an inner surface or the opening 274 of the pericyclic motion converter 220 and an outer surface 276 of the output shaft 204 and a second bearing 278 positioned between an inner surface or opening 280 of the pericyclic motion converter 222 and the outer surface 276 of the output shaft 204. The first and second bearing 272 and 278 of the illustrated example are spherical uniball bearings. In some examples, the spherical uniball bearing may be advantageous because it provides a relatively large surface area so that the pressure per unit area is significantly lower than other bearings. In some instances, the spherical uniball bearing may be lubricated (e.g., using pressurized oil) and, thus, may carry the loads with a hydrodynamic film. In some examples, the uniball bearings may incorporate a coating layer for marginal lubrication conditions. In some examples, the first bearing 272 and/or the second bearings 278 may be spherical roller bearings.

Figure 3:
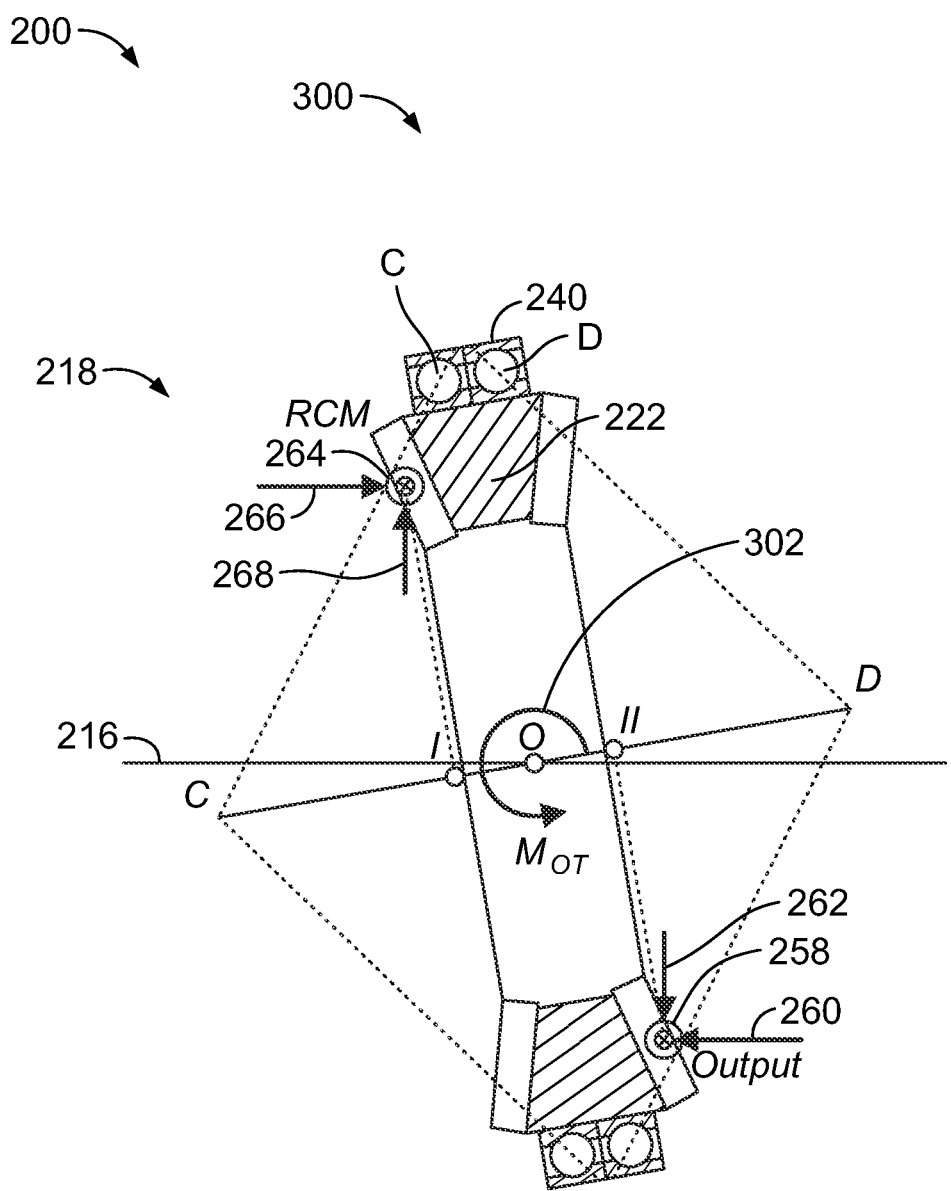
FIG. 3 is a free body diagram showing graphical representation of forces or moments generated by the example transmission of FIG. 2.

FIG. 3 is a free body diagram 300 of the pericyclic motion converter 222 of FIG. 2 including a graphical representation of the above-noted radial loads 262 and 268, axial loads 260 and 266, tangential loads 258 and 264 and/or the moment load 302 (e.g., a torque or turning moment) imparted to the pericyclic motion converter 222 as the first face gear 224 engages the reaction control member 228 and the second face gear 230 engages the second face gear 234 of the output shaft gear 236. Labels C and D represent focal points of angular contact ball or roller bearings at the support bearing 240 to which the above noted loads may be imparted. Roman numeral I represents the contact point between gear teeth of the pericyclic motion converter 222 and gear teeth of the reaction control member 228 (e.g., gear mesh 261) relative to the axis 216 and Roman numeral II represents the contact point between gear teeth of the pericyclic motion converter 222 and the output shaft gear 236 (e.g., gear mesh 263) relative to the axis 216. Reference O represents an origin and/or the wobble center point 254 about which a turning moment is imparted.

Figure 4:
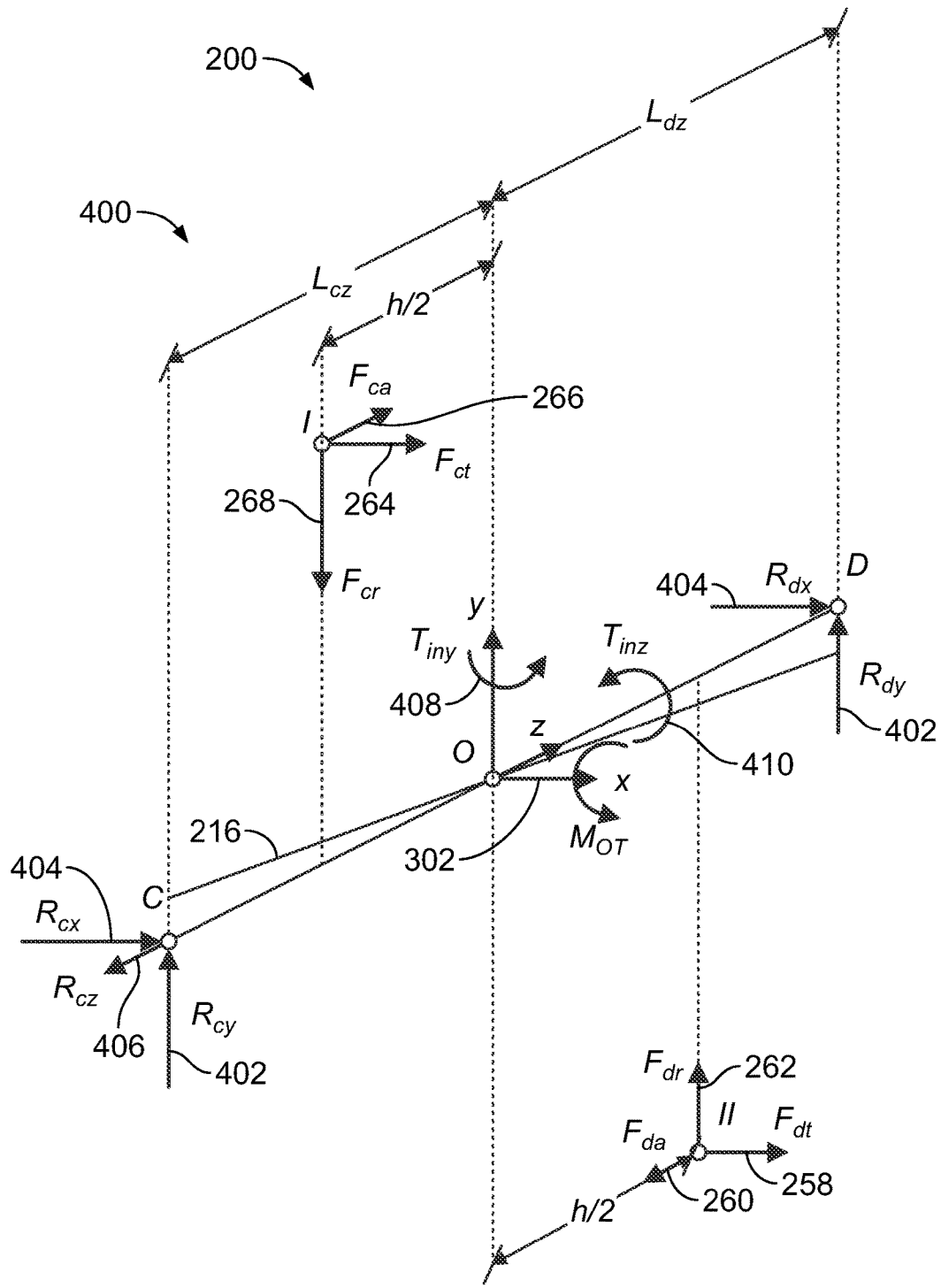
FIG. 4 is a graphical illustration of the forces or moments shown in the free body diagram shown in FIG. 3.

FIG. 4 is a graphical illustration 400 of example forces of the free body diagram 300 shown in FIG. 3. At point I, the radial mesh load 262 is imparted in a direction opposite relative the radial mesh load 268 at point II. Likewise, the axial mesh load 260 is in an opposite direction as the axial mesh load 266 at point II. As a result, the radial mesh loads 262 and 268 cancel and/or reduce a net radial force imparted to the support bearing 240. Similarly, the axial mesh loads 260 and 266 cancel and/or reduce a net (e.g., a thrust) force imparted to the support bearing 240. However, the tangential mesh loads 258 and 264 are in the same direction. As a result, the tangential mesh loads 258 and 264 are additive. In other words, the gear mesh 261 is on an opposite side (e.g., opposite side relative to the rotational axis 216) of the gear mesh 263 causing the tangential forces 258 to be additive, which can impart a relatively large load to the support bearings 238 and 240 and/or the carrier bearings 218. The tangential forces 258 and 264 impart loads that the support bearing 240, which must be configured (e.g., sized) to absorb and/or react those loads during operation as represented by bearing C and D reaction loads 402, 404 and 406 in the graph. The tangential forces 258 and 264, the axial forces 260 and 266, and/or the radial loads 262 and 268 also produce the moment 408 about a y-axis, the moment 410 about a z-axis, and the turning moment 302 about an x-axis. The moment 302 (e.g., an overturning moment) drives the rotation of the output shaft 204. In some instances, the tangential forces 258 and 264 react through and travel around a rim of the pericyclic motion converters 220 and 222. In some instances, absent the bearing apparatus 270 of the illustrated example, the tangential forces 258 and 264 may be large enough to cause the pericyclic motion converters 220 and 222 to deflect excessively. Thus, the bearing apparatus 270 discussed herein is particularly beneficial for reacting separating loads, radial loads and/or tangential loads to prevent deflection along the circumferences of the pericyclic motion converters 220 and 222.

Figure 5:
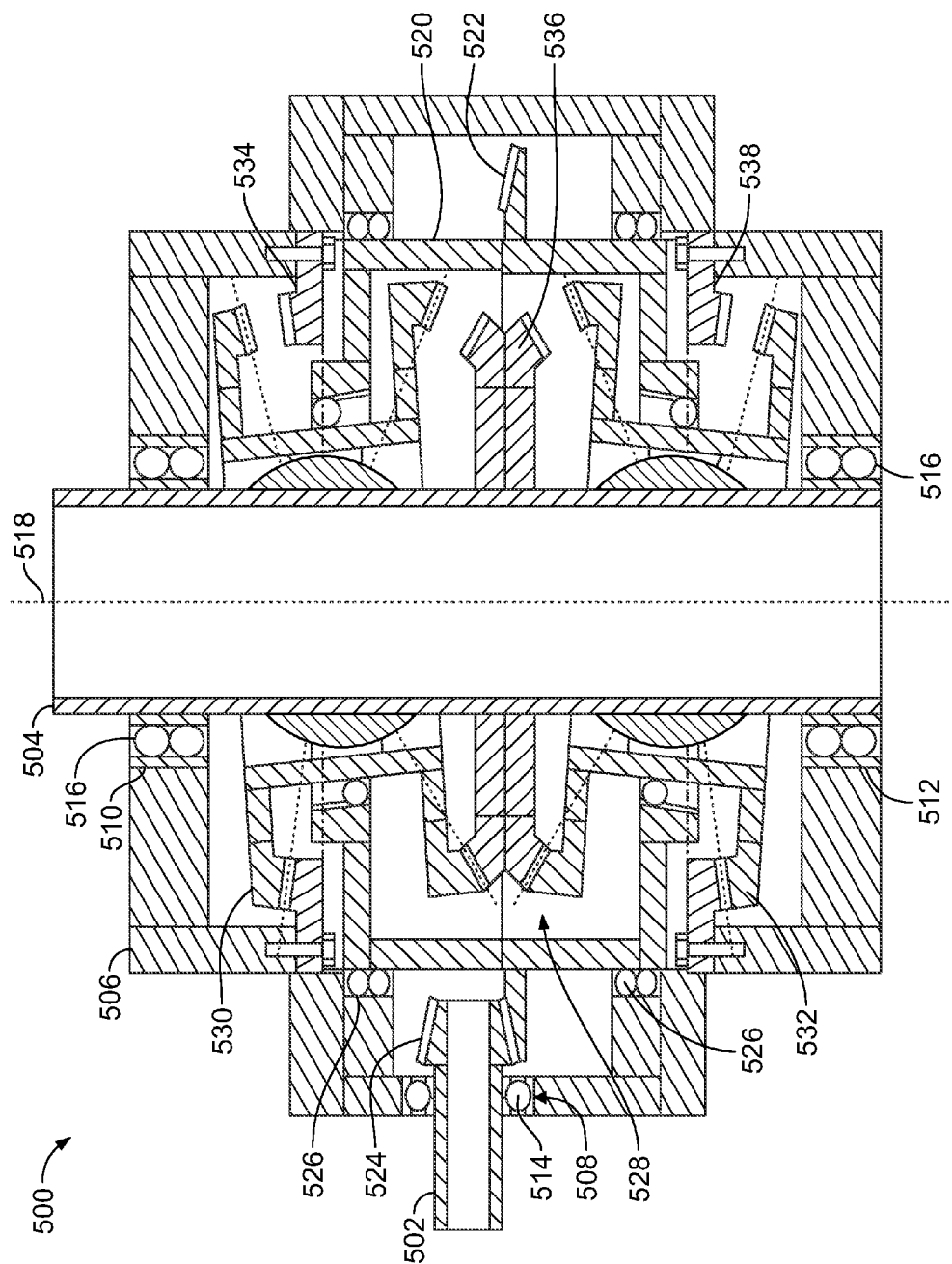
FIG. 5 is a cross-sectional view of another example transmission constructed in accordance with the teachings of this disclosure.

FIG. 5 depicts another example power transmission 500 constructed in accordance with the teachings of this disclosure. The example transmission 500 may be used to implement the transmission 110 of FIG. 1. The example power transmission 500 of the illustrated example receives power via an input shaft 502 operatively coupled to an engine (e.g., the engine 106 of FIG. 1) and an output shaft 504 to drive an output member such as, for example, the rotor system 102 of the example aircraft of FIG. 1. Specifically, the example power transmission 500 reduces speed from the input shaft 502 to the output shaft 504, while increasing a torque from the input shaft 502 to the output shaft 504. The power transmission 500 of the illustrated example employs a housing 506 having a first opening 508 to receive the input shaft 502 and respective second and third openings 510 and 512 to receive the output shaft 504. Specifically, the power transmission 500 of the illustrated example employs input shaft bearings 514 to journal the input shaft 502 for rotation relative to the housing 506 and/or to support or maintain the input shaft 502 relative to the opening 508 of the housing 506. Likewise, the power transmission 500 of the illustrated example includes output shaft bearings 516 to journal the output shaft 504 for rotation relative to the housing 506 and/or to support or maintain the output shaft 504 relative to the housing 506. The output shaft 504 of the illustrated example rotates about a rotational or longitudinal axis 518.

To drive the output shaft 504 via the input shaft 502, the power transmission 500 of the illustrated example employs a carrier 520. The carrier 520 of the illustrated example includes a peripheral or carrier gear 522 (e.g., a bevel gear) to engage an input gear 524 (e.g., a bevel gear) of the input shaft 502. In particular, the rotation of the input gear 524 via the input shaft 502 causes the carrier 520 to rotate about the longitudinal axis 518 within the housing 506 and relative to the output shaft 504. Additionally, to support, maintain and/or enable rotation of the carrier 520 relative to the housing 506, the power transmission 500 of the illustrated example employs carrier bearings 526 between the carrier 520 and the housing 506 (e.g., between outer surface of the carrier 520 and an inner surface of the housing 506). In some examples, the carrier bearings 526 help absorb loads generated by the transmission 500 as described in greater detail below.

To transfer power (e.g., reduce speed and/or increase torque) from the input shaft 502 or the carrier 520 to the output shaft 504, the power transmission 500 of the illustrated example employs a pericyclic motion assembly 528. The pericyclic motion assembly 528 of the illustrated example employs a first pericyclic motion converter 530 and a second pericyclic motion converter 532. As described in greater detail below in connection with FIG. 6, the first pericyclic motion converter 530 of the illustrated example interacts with a first reaction control member 534 and an output shaft gear 536 of the output shaft 504 and the second pericyclic motion converter 532 interacts with a second reaction control member 538 the output shaft gear 536 of the output shaft 504. The first reaction control member 534 of the illustrated example is coupled (e.g., fixed) to the housing 506 adjacent the first opening 510 and the second reaction control member 538 is coupled (e.g., fixed) to the housing adjacent the second opening 512. In particular, the first and second reaction control members 534 and 538 of the illustrated example are rotationally fixed relative to the housing 506.

Figure 6:
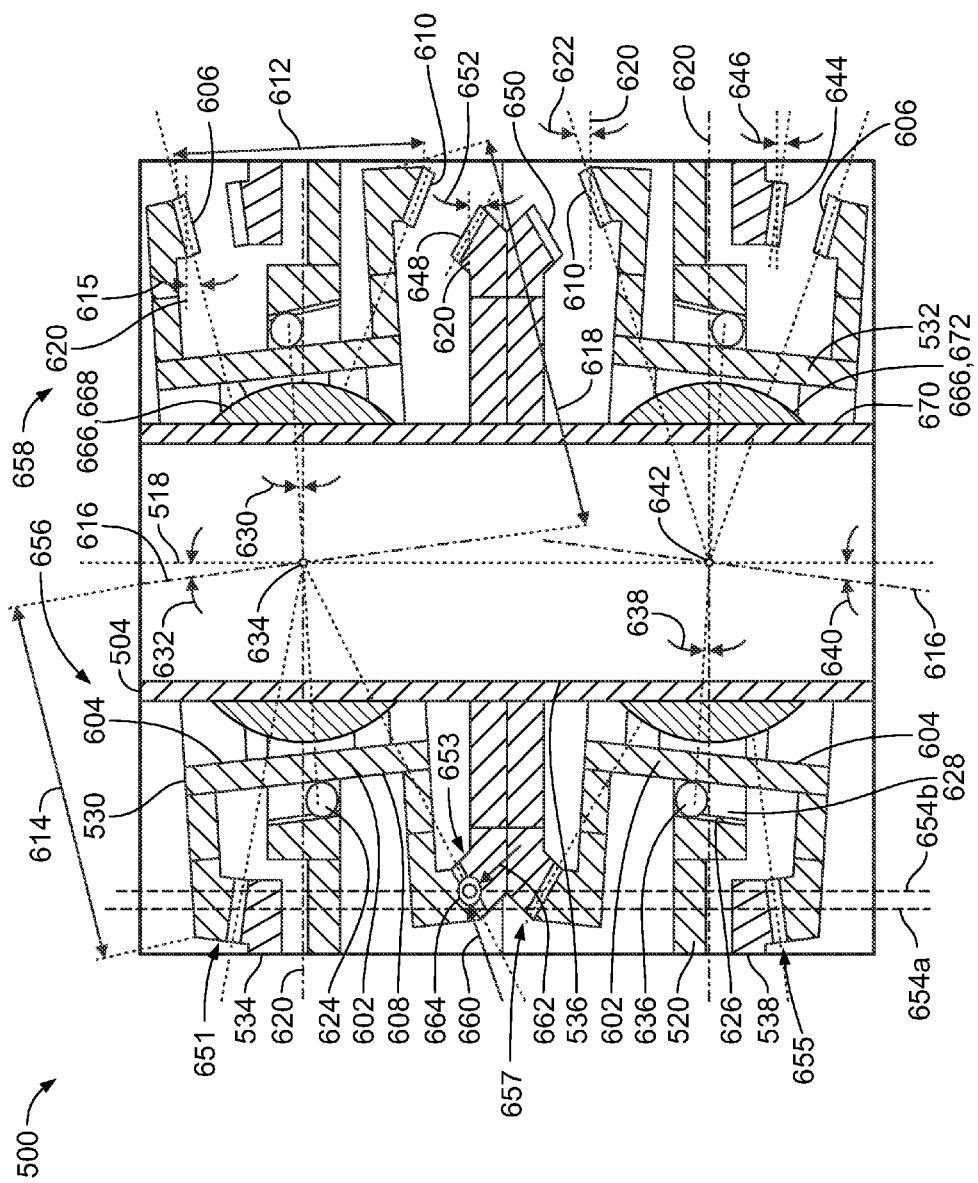
FIG. 6 is an enlarged, partial view of the example transmission of FIG. 5.

FIG. 6 is a partial cross-sectional view of the example transmission 500 of FIG. 5. The pericyclic motion converters 530 and 532 each define a body 602 (e.g., a cylindrical body) having an aperture or opening 604 to receive, but not engage, the output shaft 504. Each body 602 has a first face gear 606 that extends from an outer surface 608 of the body 602 and a second gear or second face gear 610 extending from the outer surface 608 of the body 602. The first face gear 606 and the second face gear 610 of the first pericyclic motion converter 530 of the illustrated example are oriented in a first direction (e.g., a downward direction in the orientation of FIG. 6). The first face gear 606 and the second face gear 608 of the second pericyclic motion converter 532 of the illustrated example are oriented in a second direction (e.g., an upward direction in the orientation of FIG. 6). The first direction of the illustrated example is opposite the second direction such that the respective face gears 606 and 610 of the first pericyclic motion converter 530 oppose the face gears 606 and 610 of the second pericyclic motion converter 532.

The first face gear 606 and the second face gear 610 are separated by a distance 612 (e.g., a vertical distance or height) defined by the body 602 (e.g., a height substantially equal to the height of the body 602). Additionally, the example first face gear 606 extends a first distance 614 (e.g., a horizontal distance) from a rotational or longitudinal axis 616 of the body 602 and the second face gear 610 extends a second distance 618 (e.g., a horizontal distance) from the rotational axis 616 of the body 602. In the illustrated example, the first distance 614 is substantially equal to or approximately the same as (e.g., within 10% of) the second distance 618. The first face gear 606 (e.g., beveloid gears, bevel gears, spur gears, etc.) includes a first number of gear teeth that are provided at a first angle 615 relative to a reference axis 620 (e.g., a horizontal axis in the orientation of FIG. 6). The second face gear 610 (e.g., beveloid gears, bevel gears, spur gears, etc.) includes a second number of gear teeth that are provided at a second angle 622 relative to the reference axis 620. The first number of gear teeth may be equal to or different than the second number of gear teeth. Further, the first angle 615 may be different than or equal to the second angle 622.

As shown in FIG. 6, the first pericyclic motion converter 530 is supported and/or journalled for rotation with respect to the output shaft 504, the carrier 520 and/or the housing 506 via a first support bearing 624. The support bearing 624 of the illustrated example is positioned between the outer surface 608 of the pericyclic motion converter 530 and a surface 626 defining a first opening 628 of the carrier 520 through which the output shaft 504 and the body 602 of the pericyclic motion converters 530 and 532 extend or pass. In particular, the first support bearing 624 is tilted or canted at a specific or predetermined angle 630 (e.g., a nutation angle) relative to the reference axis 620 (e.g., a horizontal reference), the housing 506 and/or the output shaft 504. As a result, the rotational axis 616 of the first pericyclic motion converter 530 is at an angle 632 (provided by the positioning of the first support bearing 624) relative to the longitudinal axis 518 of the housing 506 and/or the rotational axis of the output shaft 504. As a result of the first support bearing 624 being positioned in a canted orientation, the first support bearing 624 initiates a wobbling or nutating movement of the first pericyclic motion converter 530 relative to the output shaft 504, the housing 506 and/or the carrier 520 about a wobble center point 634. As a result, the first pericyclic motion converter 530 follows the wobbling motion directed by the first support bearing 624 via the carrier 520 while rotating about the axis 616 with respect to the first support bearing 624.

Similarly, the second pericyclic motion converter 532 is supported and/or journalled for rotation with respect to the output shaft 504, the carrier 520 and/or the housing 506 via a second support bearing 636. The first support bearing 624 is positioned between the outer surface 608 of the pericyclic motion converter 532 and the surface 626 of the carrier 520. In particular, the second support bearing 636 is tilted or canted at a specific or predetermined angle 638 (e.g., a nutation angle) relative to horizontal 620, the housing 506 and/or the output shaft 504. As a result, the rotational axis 616 of the second pericyclic motion converter 532 is at an angle 640 (provided by the positioning of the second support bearing 636) relative to the longitudinal axis 518 of the housing 506 and/or the rotational axis of the output shaft 504. As a result of the second support bearing 636 being positioned in an angled and/or canted orientation, the second support bearing 636 initiates wobbling or nutating movement of the second pericyclic motion converter 532 relative to the output shaft 504, the housing 506 and/or the carrier 520 about a wobble center point 642. As a result, the second pericyclic motion converter 532 follows the wobbling motion directed by the second support bearing 636 while rotating about the axis of rotation 616 with respect to the second support bearing 636. Further, the first pericyclic motion converter 532 of the illustrated example is out of phase (e.g., 180 degrees out of phase) relative to the second pericyclic motion converter 532 to help reduce or eliminate vibration (e.g., cancel forces) generated by the first and second pericyclic motion converters as a result of engagement with the reaction control members 534 and 538 and/or the output shaft 504.

Each of the first and second reaction control members 534 and 538 of the illustrated example is a gear (e.g., beveloid gears, bevel gears, spur gears, etc.). In the illustrated example, the first and second reaction control members 234 and 538 have a face gear 644 defining gear teeth. The face gear 644 (e.g., a fifth face gear) of the first reaction control member 534 of the illustrated example is oriented in a direction opposite an orientation of the face gear 644 (e.g., a sixth face gear) of the second reaction control member 538. More specifically, in the illustrated example, the face gear 644 of the first reaction control member 534 opposes the first face gear 606 of the first pericyclic motion converter 530 and the face gear 644 of the second reaction control member 538 opposes the first face gear 606 of the second pericyclic motion converter 532.

The first face gear 644 includes a first number of gear teeth that are provided at a first angle 646 relative to the reference axis 620 (e.g., a horizontal axis or reference). The first number of gear teeth and/or the angle 646 of the face gear 644 of the reaction control member 534 may be equal to or different than the number of teeth and/or the angle 646 of the face gear 644 of the second reaction control member 538. In some examples, the number of teeth of the first face gear 606 of the respective first and second pericyclic motion converters 530 and 532 may be different than (e.g., less than or greater than) the number of teeth of the face gear 646 of the first and second reaction control members 534 and 538. For example, the first face gears 606 of the respective first and second pericyclic motion converters 530 and 532 may have a difference of one, two, three, etc., gear teeth relative to the number of teeth of the face gears 646 of the first and second reaction control members 534 and 538. Further, the first angle 646 of the face gear 644 of the respective reaction control members 534 and 538 are similar (e.g., equal to) the first face gear 606 of the first and second pericyclic motion converters 530 and 532 to provide a balanced or complementary configuration to help reduce vibration between the reaction control members 534 and 538 and the first and second pericyclic motion converters 530 and 532.

In the illustrated example, the output shaft gear 536 is coupled to (e.g., rigidly coupled via welding or integrally formed with) the output shaft 504 such that rotation of the output shaft gear 536 causes rotation of the output shaft 504. The output shaft gear 536 of the illustrated example includes a first gear or first face gear 648 (e.g., a seventh face gear) and a second gear or second face gear 650 (e.g., an eighth face gear) opposing the first face gear 648. More specifically, the output shaft gear 536 is positioned between the first and second pericyclic motion converters 530 and 532 such that the first face gear 648 is oriented or faces the face gear 610 of the first pericyclic motion converter 530 and the second face gear 650 is oriented or faces the face gear 610 of the second pericyclic motion converter 532. The face gears 648 and 650 each include a first number of gear teeth provided at a first angle 652 relative to the reference axis 620 (e.g., a horizontal axis or reference). The number of gear teeth of the first face gear 648 may be equal to or different than a number of gear teeth of the second face gear 650. Further, the angle 652 of the face gears 648 and 650 is substantially similar to the angle 622 of the second face gear 610 of the first and second pericyclic motion converters 530 and 532.

Differential tooth numbering (e.g., varying the number of teeth) between a gear mesh provided by the face gears 608 and 644 and/or between the gear mesh provided by the face gears 610 and 648, 650 can produce or provide a reduction ratio (e.g., a speed reduction ratio) of about between 15:1 and 20:1. In some examples, gear tooth orientation of the respective face gears 608, 610, 644, 648 and/or 650 can be varied or different from a pitch cone or pitch cone angle of the respective pericyclic motion converters 530 and 532, the reaction control members 534 and 538 and/or the output shaft gear 536 allowing the face gears 608, 610, 644, 648 and/or 650 and/or the pericyclic motion converters 530 and 532, the reaction control members 534 and 538 and/or the output shaft gear 536 to be angled or titled at different angles relative to a standard cone pitch angle to provide further weight reduction, overall dimensional envelope reduction, etc.

In operation, referring to FIGS. 5 and 6, the input shaft 502 (driven via an engine) provides an input speed and/or input torque to the carrier 520. In turn, the carrier 520 rotates relative to the output shaft 504 and drives the first and second pericyclic motion converters 530 and 532 via the respective first and second support bearings 624 and 636. Specifically, the first and second support bearings 624 and 636 impart a wobbling motion to the respective first and second pericyclic motion converters 530 and 532. For example, as the first pericyclic motion converter 530 rotates about the axis of rotation 616 and wobbles relative to the wobble center point 634, a portion or segment of the first face gear 606 of the first pericyclic motion converter 530 engages or enmeshes with a portion or segment (e.g., a partial circumference) of the face gear 644 of the reaction control member 534 to provide a first gear mesh 651, and a portion of segment of the second face gear 610 of the first pericyclic motion converter 530 engages or enmeshes with a portion or segment (e.g., a partial circumference) of the first face gear 648 of the output shaft gear 536 to provide a second gear mesh 653. Similarly, as the second pericyclic motion converter 532 rotates about the axis of rotation 616 and wobbles relative to the wobble center point 642, a portion or segment of the first face gear 606 of the second pericyclic motion converter 532 engages or enmeshes with a portion or segment (e.g., a partial circumference) of the face gear 644 of the reaction control member 538 to provide a third gear mesh 655, and a portion of segment of the second face gear 610 of the second pericyclic motion converter 532 engages or enmeshes with a portion or segment (e.g., a partial circumference) of the second face gear 650 of the output shaft gear 536 to provide a fourth gear mesh 657. In particular, the example gear meshes 651 and 655 are substantially aligned along a first line of contact 654a and the example gear meshes 653 and 657 are substantially aligned along a second line of contact 654b. The first line of contact 654a of the illustrated example is adjacent the second line of contact 654b and the line of contacts 654a and 654b are substantially parallel to the longitudinal axis 518. In some examples, the first line of contact 654a is separated from the second line of contact 654b in a lateral direction by a distance provided by a difference between the first distance 614 and the second distance 618. In some examples, the first and second line of contacts 654a and 654b are coaxial or collinear. In other words, the example gear meshes 651, 653, 655 and 657 are positioned along a first side 656 of the longitudinal axis 518. Additionally, another portion or segment of the first face gears 606 of the pericyclic motion converters 530 and 532 are spaced from or disengaged (e.g., unmeshed) with the respective face gears 644 of the reaction control members 534 and 538, and another portion or segment of the second face gears 610 of the pericyclic motion converters 530 and 532 are spaced from or disengaged (e.g., unmeshed) with the respective first and second face gears 648 and 650 of the output shaft gear 536 along a second side 658 of the longitudinal axis 518 opposite the first side 656. The line of contacts 654a and 654b follow the wobble movement of the respective first and second pericyclic motion converters 530 and 532 as the pericyclic motion converters 530 and 532 wobble about the respective wobble center points 634 and 642.

Because the first and second pericyclic motion converters 530 and 532 are out of phase, the first and second pericyclic motion converters 530 and 532 are self-balancing. In other words, moments and vibrations generated by the pericyclic motion converters 530 and 532 are equal in magnitude and opposite in direction. Thus, the power transmission 500 of the illustrated example does not require auxiliary balancing elements (e.g., counterweights). For example, the dual pericyclic motion converters 530 and 532 eliminate use of counterweights that might otherwise be necessary to eliminate dynamic imbalance caused by nutation motion of the pericyclic motion converters 530 and 532 due to the mounting arrangement. For example, the pericyclic motion converters 530 and 532 overcome the dynamic imbalance via thrust force cancellation. In some examples, counterweights and/or other counter balancing mechanisms may be employed when, for example, the transmission 500 is implemented with only the first pericyclic motion converter 530, the first reaction control member 538, and the face gear 648 of the output shaft gear 536. In other words, the second pericyclic motion converter 532 and the second reaction control member 540 may be omitted and vibrations produced by the interactions between the first pericyclic motion converter 530, the first reaction control member 538, and the output shaft gear 536 may be counter balanced using other structures, configurations and/or mechanisms (e.g., counterweights).

However, as a result of engagement between the pericyclic motion converters 530 and 532 with the reaction control members 534 and 538 and the output shaft gear 536, axial loads 660 (e.g., side or thrust loads), radial loads 662 and/or tangential loads 664 and/or moments (e.g., turning moments) may be generated. For example, the gear separating or radial forces 662, the tangential forces 664, the side or thrust forces 660 and/or moment forces are produced as a result of engagement of the gear teeth between the pericyclic motion converters 530 and 532, the reaction control members 534 and 538 and the output shaft gear 536 (e.g., forces produced locally at the gear teeth). However, because the distances 614 and 618 are substantially the same and/or the pericyclic motion converters 530 and 532 engage the respective reaction control members 534 and 538 along the line of contact 654a and the respective face gears 648 and 650 along the line of contact 654b, the tangential gear forces 664 and/or the overturning moments imposed on the pericyclic motion converters 530 and 532 from the reaction control members 534 and 538 and the output shaft gear 536 are substantially equal (e.g., within between approximately 5%-15%) and opposite in direction. In other words, the gear teeth meshing between face gears 606 of the pericyclic motion converters 530 and 532 and the face gears 644 of the reaction control members 534 and 538 being very near or substantially aligned with the alignment of the gear teeth mesh between the face gears 610 with the respective face gears 648 and 650 limit, reduce and/or cancel tangential load reactions into the support bearings 624 and 636, the carrier bearings 526 and/or the housing 506. As a result, the tangential loads 664 are not imparted to the support bearings 624 and 636 and/or the carrier bearings 526 but, instead, are transmitted to the output shaft 504 and generate the output torque. More specifically, the tangential loads 664 only travel locally adjacent the point of contact between the reaction control members 534 and 538 and the pericyclic motion converters 530 and 532 and the output shaft 504. Indeed, because the tangential loads of the illustrated example are on the same side, the tangential loads to do not travel around rims of the respective pericyclic motion converters 530 and 532, the reaction control members 534 and 538 and/or the output gear 620 of the output shaft 504. In other words, load introduction is adjacent or near load output. In this manner, a reduced strain is imparted to the peripheral edge (e.g., outer circumference) of the respective pericyclic motion converters 530 and 532, the reaction control members 534 and 538 and/or the output gear 620 of the output shaft 504 to limit an amount of deflection of the peripheral edge of the respective the respective pericyclic motion converters 530 and 532, the reaction control members 534 and 538 and/or the output gear 620 of the output shaft 504. As a result, the peripheral edges of the pericyclic motion converters 530 and 532, the reaction control members 534 and 538 and/or the output gear 620 of the output shaft 504 retain form and/or a geometrical shape. In other words, the peripheral edges or rims of the pericyclic motion converters 530 and 532, the reaction control members 534 and 538 and/or the output gear 620 of the output shaft 504 are not distorted during operation.

Thus, some of the gear forces such as the tangential forces 664 are effectively canceled and/or not reacted into the support bearings 624 and 636, the carrier bearings 526 and/or the housing 506. In this manner, the support bearings 624 and 636 and/or the carrier bearings 526 can be sized smaller. For example, the support bearings 624 and 636 and/or the carrier bearings 526 can be sized smaller than the support bearings and/or the carrier bearings of the example transmission 200 of FIG. 2.

To further reduce the loads imparted to the support bearings 624 and 636 and/or the carrier bearings 526, the example transmission 500 of the illustrated example may include a bearing assembly 666. The bearing assembly 666 of the illustrated example absorbs and/or reduces at least some of these forces (e.g., the tangential forces 664, the radial forces 662, the axial forces 660, the moments, etc.) that would otherwise be imparted or reacted into the support bearings 624 and 636, the carrier bearings 526 and/or the housing 506. Therefore, the example bearing assembly 666 enables the transmission 500 to have a reduced dimensional envelope and/or weight by enabling the support bearings 624 and 636 and/or the carrier bearings 526 to be manufactured with a smaller dimensional envelope or footprint that would otherwise be required without the bearing assembly 666.

In particular, the bearing assembly 666 of the illustrated example includes a first bearing 668 positioned between the inner surface 604 of the first pericyclic motion converter 530 and an outer surface 670 of the output shaft 504 and a second bearing 672 positioned between the inner surface 604 of the second pericyclic motion converter 532 and the outer surface 670 of the output shaft 504. In the illustrated example, the first and second bearings 668 and 672 are spherical uniball bearings. For example, the spherical uniball bearings may be advantageous because they provides a relatively large surface area so that the pressure per unit area is much lower than other bearings such as, for example, a spherical roller bearing. In some instances, the spherical uniball bearing may be lubricated (e.g., using pressurized oil) and thus, may carry at least some of the loads on a hydrodynamic film. In some examples, the uniball bearings may incorporate a soft material or antifriction fabric layer for marginal lubrication conditions. In some examples, the first bearing 668 and/or the second bearing 672 may be spherical roller bearings and/or any other suitable bearing.

Figure 7:
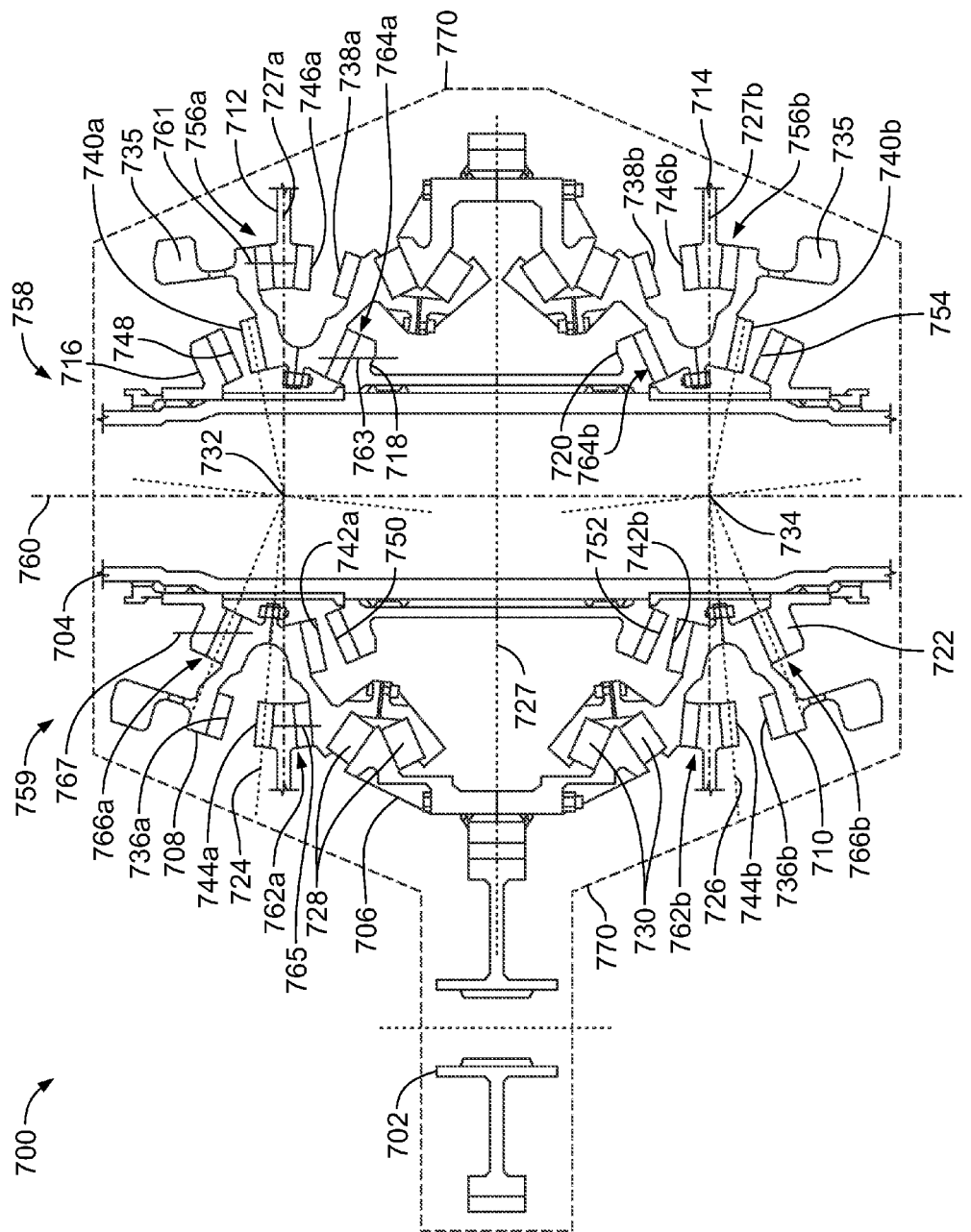
FIG. 7 is a cross-sectional view of another example transmission constructed in accordance with the teachings of this disclosure.

FIG. 7 illustrates another example transmission 700 constructed in accordance with the teachings of this disclosure. The example power transmission 700 may be used to implement the transmission 110 of FIG. 1. The example power transmission 700 of the illustrated example receives power via an input shaft 702 operatively coupled to an engine (e.g., the engine 106 of FIG. 1) and includes an output shaft 704 to drive an output member such as, for example, the rotor system 102 of the example aircraft 100 of FIG. 1. Specifically, the example transmission 700 reduces speed from the input shaft 702 to the output shaft 704, while increasing a torque from the input shaft 702 to the output shaft 704. To reduce the speed between the input shaft 702 and the output shaft 704, the example transmission 700 employs a carrier 706 that transfers power from the input shaft 702 to the output shaft 704 via pericyclic motion converters 708 and 710. Specifically, similar to the transmission 200 and 500 discussed above, the example pericyclic motion converters 708 and 710 engage or cooperate with respective reaction control members 712 and 714 and respective output shaft gears 716, 718, 720 and 722. The pericyclic motion converters 708 and 710 are mounted at respective nutation angles 724 and 726 (e.g., an angle between about 20 degrees and 80 degrees relative to a reference 727 which is horizontal in the orientation of FIG. 7) via respective support bearing pairs 728 and 730. The pericyclic motion converters 708 and 710 wobble about respective wobble points 732 and 734. In the illustrated example, to help offset vibrational forces between the pericyclic motion converters 708 and 710 and/or help balance wobble motion about the respective wobble points 732 and 734, the example pericyclic motion converters 708 and 710 employ counterweights 735.

The example pericyclic motion converters 708 and 710 of the illustrated example include first face gears 736a and 736b, second face gears 738a and 738b, third face gears 740a and 740b and fourth face gears 742a and 742b, respectively. In the illustrated example, the first face gear 736a is oriented in a direction that opposes or faces toward the second face gear 738a, and the third face gear 740a is oriented in a direction that is opposite the orientation of the fourth face gear 742a such that the third face gear 740a faces away from the fourth face gear 742a. In the orientation of FIG. 7, the first face gear 736a and the fourth face gear 742a are oriented in a downward direction and the second face gear 738a and third face gear 740a are oriented in an upward direction.

In the illustrated example, the first face gear 736b is oriented in a direction that opposes or faces toward the second face gear 738b, and the third face gear 740b is oriented in a direction opposite from the orientation of the fourth face gear 742b such that the third face gear 740b faces away from the fourth face gear 742b. In the orientation of FIG. 7, the first face gear 736b and the fourth face gear 742b are oriented in an upward direction and the second face gear 738b and third face gear 740b are oriented in a downward direction.

In addition, the reaction control member 712 includes a first face gear 744a and a second face gear 746a. The first face gear 744a is oriented in a direction that is opposite from the orientation of the second face gear 746a such that the first face gear 744a faces away from the second face gear 746a. In the orientation of FIG. 7, the first face gear 744a is oriented in an upward direction and the second face gear 746a is oriented in a downward direction. Similarly, the reaction control member 714 includes a first face gear 744b and a second face gear 746b. The first face gear 744b of the illustrated example is oriented in a direction that is opposite from the orientation of the second face gear 746b such that the first face gear 744b faces away from the second face gear 746b. In the orientation of FIG. 7, the first face gear 744b is oriented in a downward direction and the second face gear 746b is oriented in an upward direction.

Additionally, the output shaft gears 716, 718, 720 and 722 define respective output face gears 748, 750, 752 and 754. In the illustrated example, the face gear 748 of the output shaft gear 716 and the face gear 752 of the output shaft gear 720 are oriented in a downward direction, and the face gear 750 of the output shaft gear 718 and the face gear 754 of the output shaft gear 722 are oriented in an upward direction.

In some examples, the face gears 736a-b, 738a-b, 740a-b, 742a-b, 744a-b, 746a-b, and 748-754 may be bevel gears (e.g., straight bevel gears), beveloid gears, and/or any other suitable gear type. Further, the tooth numbering and/or tooth orientation of the face gears 736a-b, 738a-b, 740a-b, 742a-b, 744a-b, 746a-b, and 748-754 may be configured to achieve differential speed reduction, torque outputs, etc. For example, the number of gear teeth on the first face gears 736a-b of the first and second pericyclic motion converters 708 and 710 may have 70 gear teeth, the second face gears 738a-b of the pericyclic motion converters 708 and 710 may have 54 gear teeth, the face gears 744a-b and 746a-b of the reaction control members 712 and 714 may have 69 gear teeth and the face gears 748-754 of the output gears 716-722 may have 52 gear teeth.

In operation, a portion or segment of the first face gear 736a of the first pericyclic motion converter 708 engages or enmeshes with a portion or segment of the first face gear 744a of the reaction control member 712 to provide a gear mesh 756a (e.g., a first gear mesh) and a portion or segment of the second face gear 738a of the first pericyclic motion converter 708 engages or enmeshes with a portion or segment of the second face gear 746a of the reaction control member 712 to provide a gear mesh 762a (e.g., a second gear mesh). Additionally, a portion or segment of the third face gear 740a of the first pericyclic motion converter 708 engages or enmeshes with a portion or segment of the face gear 748 of the output shaft gear 716 to provide a gear mesh 766a (e.g., a third gear mesh) and a portion or segment of the fourth face gear 742a engages or enmeshes with a portion or segment of the face gear 750 of the output shaft gear 718 to provide a gear mesh 764a (e.g., a fourth gear mesh).

More specifically, the gear meshes 756a and 764a are provided on a first side 758 of a longitudinal axis 760 of the shaft 704. The gear mesh 756a is along a first line of contact 761 and the gear mesh 764a is along a second line of contact 763 spaced from the first line of contact 761. The gear meshes 762a and 766a are provided on a second side 759 of the longitudinal axis 760 (e.g., opposite the gear mesh 756). The gear mesh 762a is along a third line of contact 765 and the gear mesh 764a is along a fourth line of contact 767 spaced from the third line of contact 765. Additionally, in the illustrated example, the gear mesh 756a and 766a are on a first side of a reference 727a (e.g., a horizontal reference) perpendicular to a longitudinal axis of the pericyclic motion converter 708 and the gear meshes 762a and 764a are on a second side of the reference 727a opposite the first side.

Similarly, the gear meshes 756b and 764b are provided on the first side 758 of the longitudinal axis 760 and the gear meshes 762b and 766b are provided on the second side 759 of the longitudinal axis 760 (e.g., opposite the gear meshes 756b and 764b). The gear mesh 756b is along the first line of contact 761, the gear mesh 764b is along the second line of contact 763, the gear mesh 762b is on the third line of contact 765 and the gear mesh 766b is on the fourth line of contact 767. Additionally, in the illustrated example, the gear mesh 756b and 766b are on a first side of a reference 727b (e.g., a horizontal reference) perpendicular to a longitudinal axis of the pericyclic motion converter 710 and the gear meshes 762b and 764b are on a second side of the reference 727b opposite the first side.

The orientation and/or position (e.g., relative to the longitudinal axis 760) of the gear meshes 756a-b, 762a-b, 764a-b and 766a-b enable some of the gear forces and/or moments generated when the face gears 736a-b, 738a-b, 740a-b, 742a-b, 744a-b, 746a-b, and 748-754 enmesh or engage to be reduced and/or canceled instead of reacted through and/or into the pericyclic support bearing pairs 728 and 730. For example, at least some of the forces (e.g., tangential loads and/or side or thrust loads) generated by the gear mesh 766a offset or reduce with at least some of the forces (e.g., tangential loads and/or side or thrust loads) generated by the gear mesh 762a because the gear meshes 766a and 762a are on the same side of the longitudinal axis 760. Similarly, at least some of the forces (e.g., tangential loads and/or side or thrust loads) generated by the gear mesh 756a offset or reduce with at least some of the forces (e.g., tangential loads and/or side or thrust loads) generated by the gear mesh 764a because the gear meshes 756a and 764a are on the same side of the longitudinal axis 760.

Additionally, at least some of the forces (e.g., tangential loads and/or side or thrust loads) generated by the gear mesh 766b offset or reduce with at least some of the forces (e.g., tangential loads and/or side or thrust loads) generated by the gear mesh 762b because the gear meshes 766b and 762b are on the same side of the longitudinal axis 760. Similarly, at least some of the forces (e.g., tangential loads and/or side or thrust loads) generated by the gear mesh 756b offset or reduce with at least some of the forces (e.g., tangential loads and/or side or thrust loads) generated by the gear mesh 764b because the gear meshes 756b and 764b are on the same side of the longitudinal axis 760.

Additionally or alternatively, at least some of the forces (e.g., tangential loads and/or side or thrust loads) generated by the gear mesh 766a offset or reduce with at least some of the forces (e.g., tangential loads and/or side or thrust loads) generated by the gear mesh 766b because the gear meshes 766a and 766b are on the same side of the longitudinal axis 760 and/or are long the same line of contact 767. Additionally or alternatively, at least some of the forces (e.g., tangential loads and/or side or thrust loads) generated by the gear mesh 762a offset or reduce with at least some of the forces (e.g., tangential loads and/or side or thrust loads) generated by the gear mesh 762b because the gear meshes 762a and 762b are on the same side of the longitudinal axis 760 and/or are along the same line of contact 765.

Additionally or alternatively, at least some of the forces (e.g., tangential loads and/or side or thrust loads) generated by the gear mesh 756a offset or reduce with at least some of the forces (e.g., tangential loads and/or side or thrust loads) generated by the gear mesh 756b because the gear meshes 756a and 756b are on the same side of the longitudinal axis 760 and/or along the same line of contact 761. Additionally or alternatively, at least some of the forces (e.g., tangential loads and/or side or thrust loads) generated by the gear mesh 764a offset or reduce with at least some of the forces (e.g., tangential loads and/or side or thrust loads) generated by the gear mesh 764b because the gear meshes 764a and 764b are on the same side of the longitudinal axis 760 and/or are on the same line of contact 763.

For example, the loads generated by the gear mesh 756a are in the same direction as the loads generated by the gear meshes 756b, 764a and/or 764b, thereby reducing, offsetting and/or canceling loads (e.g., tangential loads). Similarly, the loads generated by the gear mesh 762a are in the same direction as the loads generated by the gear meshes 762b, 766a, and/or 766b, thereby reducing, offsetting and/or canceling loads (e.g., tangential loads). As a result of the opposing gear forces developed or produced by the multiple gear meshes 756a-b, 762a-b, 764a-b and 766a-b, pericyclic support bearing pairs 728 and 730 can be sized to react smaller loads generated by the gear meshes 756a-b, 762a-b, 764a-b, and 766a-b than would otherwise be required if, for example, the pericyclic motion converters 708 and 710 were configured with only the gear meshes 756a-b and 766a-b.

For example, in the illustrated example, overturning moments from the pericyclic motion converter 708 are reacted through the carrier 706 against similar but opposite overturning moments from the pericyclic motion converter 710. Additionally or alternatively, if the example transmission 700 of the illustrated example is configured without bearings between the carrier 706 and a housing 770 of the transmission 700. In this manner, the side loads, for example, cannot react from the carrier 706 to the housing 770 because absent the carrier bearings, a load path is not provided to the housing 770. On the contrary, loads that are not balanced react between the pericyclic motion converters 708 and 710 via the carrier 706. Forces not balanced or reacted through the pericyclic motion converters 708 and/or 710 are reacted through the output shaft 704 and/or the support bearing pairs 728 and 730.

Figure 8:
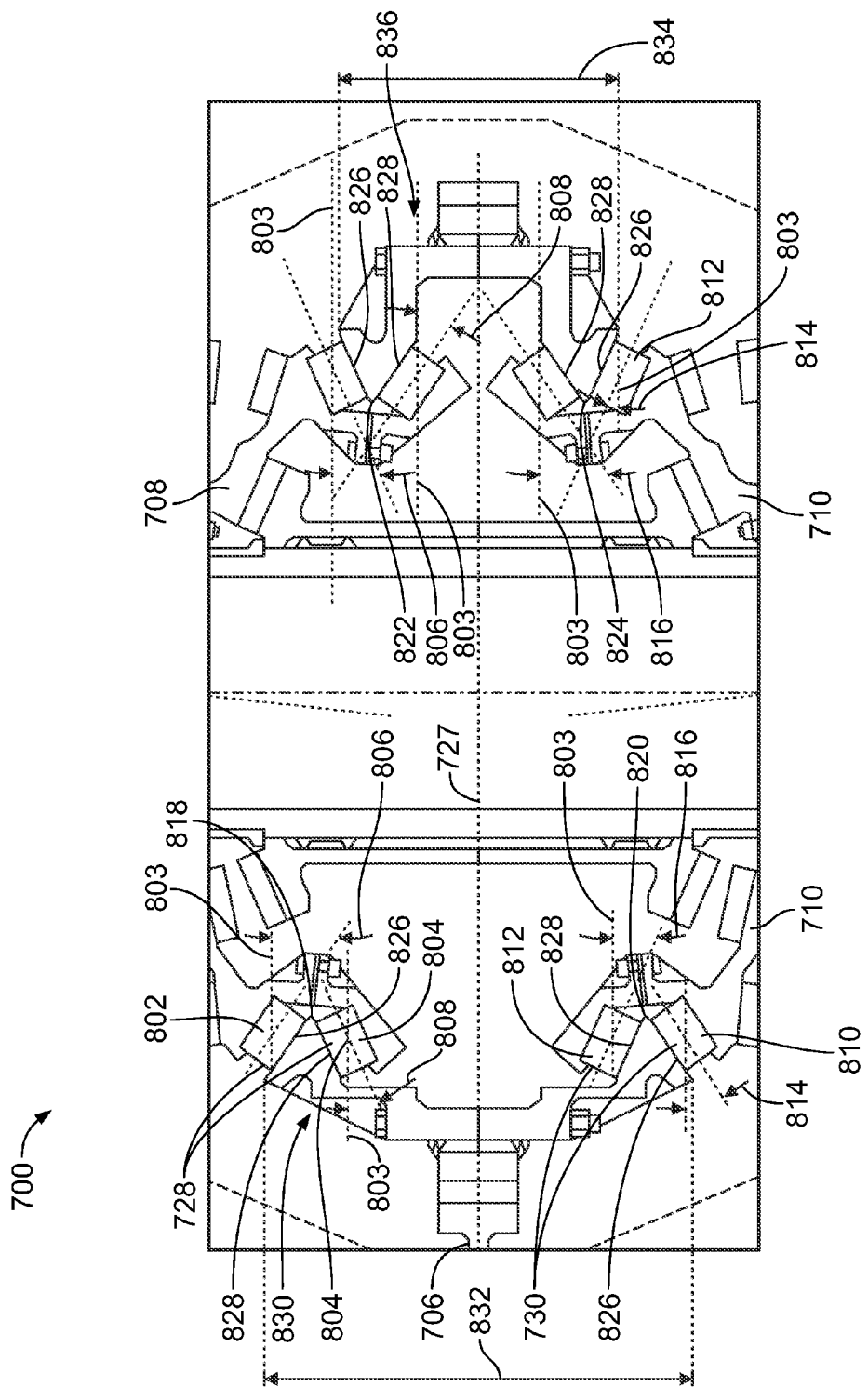
FIG. 8 is an enlarged, partial view of the example transmission of FIG. 7.

FIG. 8 is a partial enlarged view of the example transmission 700 of FIG. 7. Referring to FIG. 8, the support bearing pair 728 is positioned between the carrier 706 and the first pericyclic motion converter 708. The support bearing pair 728 of the illustrated example includes a first tapered roller bearing 802 and a second tapered roller bearing 804 (e.g., external, high thrust angle tapered roller bearings). The first tapered roller bearing 802 is mounted between the pericyclic motion converter 708 and the carrier 706 at a first angle 806 relative to a reference 803 (e.g., a horizontal reference) and the second tapered roller bearing 804 is mounted between the pericyclic motion converter 708 and the carrier 706 at a second angle 808 relative to the reference 803. The first angle 806 of the illustrated example is different than the second angle 808. The first and second tapered roller bearings 802 and 804 are a plurality of tapered roller bearings configured in a ring pattern about the output shaft 704.

The support bearing pair 730 is positioned between the carrier 706 and the first pericyclic motion converter 708. The support bearing pair 730 of the illustrated example includes a first tapered roller bearing 810 and a second tapered roller bearing 812 (e.g., external, high thrust angle tapered roller bearings). The first tapered roller bearing 810 is mounted between the pericyclic motion converter 708 and the carrier 706 at a first angle 814 relative to the reference 803 and the second tapered roller bearing 812 is mounted between the pericyclic motion converter 708 and the carrier 706 at a second angle 816 relative to the reference 803. The first angle 814 of the illustrated example is different than the second angle 816. The first and second tapered roller bearings 810 and 812 are a plurality of tapered roller bearings configured in a ring pattern about the output shaft 704.

To mount or provide the first angle 806 of the first tapered roller bearing 802, the second angle 808 of the second tapered roller bearing 804, the first angle 814 of the first tapered roller bearing 810, and the angle 816 of the second tapered roller bearing 812, the example carrier 706 and/or the pericyclic motion converter 708 include bearing mounting surfaces 818-824. The bearing mounting surface 818 (e.g., a first bearing mounting surface) is spaced from the bearing mounting surface 820 (e.g., a second bearing mounting surface) (e.g., a midpoint of a length of height of the carrier 706) and the bearing mounting surface 822 (e.g., a third bearing mounting surface) is spaced from the bearing mounting surface 824 (e.g., a fourth bearing mounting surface). In this example, the first and second bearing mounting surfaces 818 and 820 oppose the respective third and fourth bearing mounting surfaces 822 and 824 relative to the longitudinal axis 760. Each of the bearing mounting surfaces 818-824 of the illustrated example includes a first tapered surface 826 and a second tapered surface 828 opposing the first tapered surface 826. In the illustrated example, the second tapered surfaces 828 of the first and third bearing mounting surfaces 818 and 822 oppose or are oriented toward the second tapered surfaces 828 of the second and fourth bearing mounting surfaces 820 and 824. Additionally, in the illustrated example, the tapered surfaces 826 converge with the respective tapered surfaces 828 along a first side of the tapered surfaces 826 and 828 to a common point.

More specifically, the first tapered roller bearing 802 is supported by the first tapered surface 826 of the first bearing mounting surface 818 and the first tapered surface 826 of the third bearing mounting surface 822. The second roller bearing 804 is supported by the second tapered surface 828 of the first bearing mounting surface 818 and the second tapered surface 828 of the third bearing mounting surface 822. Additionally, the first roller bearing 810 of the illustrated example is supported by the first tapered surface 826 of the second bearing mounting surface 820 and the first tapered surface 826 of the fourth bearing mounting surface 824. The second roller bearing 812 of the illustrated example is supported by the second tapered surface 828 of the second bearing mounting surface 820 and the second tapered surface 828 of the fourth bearing mounting surface 824.

Further, to mount the example tapered roller bearings 802, 804, 810, and 812 at the respective angles 806, 808, 814 and 816, a first portion 830 of the carrier 706 has a distance or height 832 (e.g., between the first and second mounting surfaces 818 and 820) that is different than (e.g., greater than) a distance or height 834 (e.g., between the third and fourth mounting surfaces 822 and 824) of a second portion 836 of the carrier 706 opposite the first portion 830. The tapered roller bearings 802, 804, 810, and 812 are mounted externally relative to the pericyclic motion converters 708 and 710 (e.g., along and/or adjacent outer surfaces of the pericyclic motion converters 708 and 710). In other words, the tapered roller bearings 802, 804, 810, and 812 are mounted adjacent outer surfaces of the respective pericyclic motion converters 708 and 710 and extend around the longitudinal axis 760 to substantially surround the output shaft 704.

Figure 9:
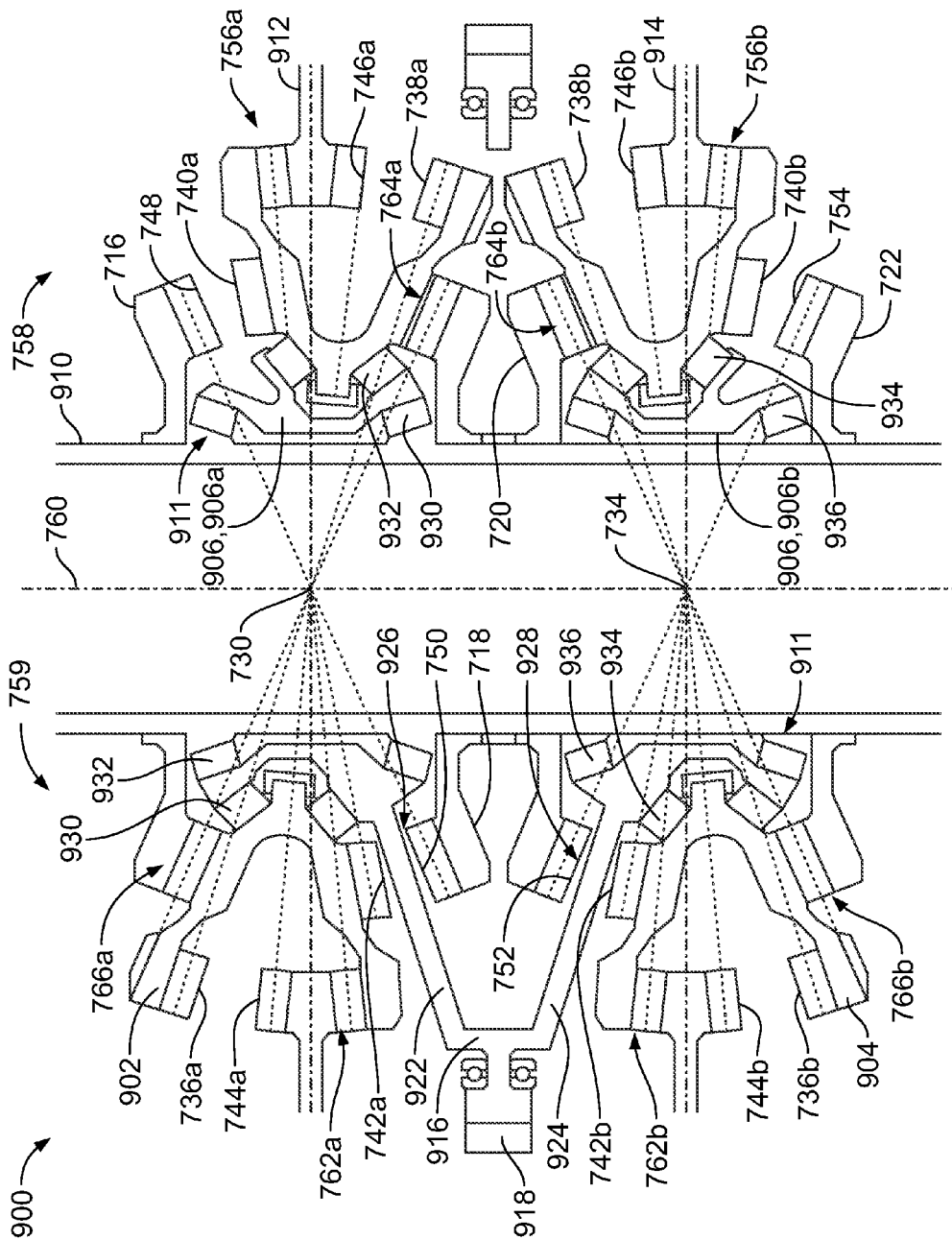
FIG. 9 is a cross-sectional view of another example transmission constructed in accordance with the teachings of this disclosure.

FIG. 9 depicts another example power transmission 900 constructed in accordance with the teachings of this disclosure. The example transmission 900 may be used to implement the transmission 110 of FIG. 1. The example transmission 900 includes pericyclic motion converters 902 and 904 that transfer power between a carrier 906 and an output shaft 910. The pericyclic motion converters 902 and 904 react with respective reaction control members 912 and 914 to transfer power between the carrier 906 and the output shaft 910.

Those components of the example transmission 900, the example pericyclic motion converters 902 and 904, the output shaft 910, and the reaction control members 912 and 914 that are substantially similar or identical to the components of the example transmission 700, the example pericyclic motion converters 708 and 710, the output shaft 704, and the reaction control members 712 and 714 described above in connection with FIG. 7 and that have functions substantially similar or identical to the functions of those components will not be described in detail again below. Instead, the interested reader is referred to the above corresponding descriptions. To facilitate this process, similar reference numbers will be used for like structures.

For example, the pericyclic motion converters are mounted at respective nutation angles and wobble about respective wobble points 732 and 734. For example, the pericyclic motion converter 902 includes face gears 736a, 738a, 740a, and 742a; the example pericyclic motion converter 904 includes face gears 736b, 738b, 740, and 742b; the example reaction control member 912 includes face gears 744a and 746a; the example reaction control member 914 includes face gears 744b and 746b; the output shaft 910 includes output shaft gears 716, 718, 720, and 722 having face gears 748, 750, 752, and 754, respectively. The pericyclic motion converters 902 and 904 enmesh and/or engage the respective reaction control members 912 and 914 and the output shaft gears 748-754 in a substantially similar manner as the pericyclic motion converters 708 and 710, the reaction control members 712 and 714 and the output shaft gears 748-754 to provide substantially similar canceling, reducing and/or offsetting forces as described above in connection with the transmission 700 of FIGS. 7 and 8. For example, the face gears 736a and 744a provide a gear mesh 756a and the face gears 742a and 750 provide a gear mesh 764a at a first side 758 of a longitudinal axis 760 of the shaft 704. The face gears 738a and 746a provide a gear mesh 762a and the face gears 740a and 748 provide a gear mesh 766a on a second side 759 of the longitudinal axis 760 (e.g., opposite the gear mesh 756a). Similarly, the face gears 736b and 744b provide a gear mesh 756b and the face gears 742b and 752 provide a gear mesh 764b on the first side 758 of the longitudinal axis 760. The face gears 738b and 746b provide a gear mesh 762b and the face gears 740b and 754 provide a gear mesh 766b on the second side 759 of the longitudinal axis 760 (e.g., opposite the gear mesh 756b). For example, the orientation and/or position of the gear meshes 756a-b, 762a-b, 764a-b and 766a-b enable some of the gear forces and/or moments generated when the face gears 736a-b, 738a-b, 740a-b, 742a-b, 744a-b, 746a-b, and 748-754 enmesh or engage to be reduced and/or canceled.

In the illustrated example, at least a portion of the carrier 906 is mounted between the pericyclic motion converters 902 and 904 and the output shaft 910 (e.g., internally relative to the pericyclic motion converters 902 and 904). The carrier 906 of the illustrated example supports a bearing system or assembly 911 and induces a wobbling motion to the pericyclic motion converters 902 and 904. More specifically, the carrier 906 of the illustrated example includes a first carrier 906a mounted between the first pericyclic motion converter 902 (e.g., an inner surface of the pericyclic motion converter 902 adjacent an opening receiving the output shaft 910) and (e.g., an outer surface of) the output shaft 910 and a second carrier 906b mounted between the second pericyclic motion converter 904 (e.g., an inner surface of the pericyclic motion converter 904 adjacent an opening receiving the output shaft 910 and (e.g., an outer surface of) the output shaft 910. For example, the first carrier 906a of the illustrated example is positioned between the output shaft gear 716 and the output shaft gear 718 and the second carrier 906b is positioned between output shaft gear 720 and the output shaft gear 722.

A link or tether 916 operatively couples the first and second carriers 906a and 906b to an input gear 918 (e.g., a common input gear) that is driven via an input shaft (e.g., the input shaft 702 of FIG. 7). More specifically, the tether 916 includes a first arm 922 coupled to the first carrier 906a and a second arm 924 coupled to the second carrier 906b. The first and second arms 922 and 924 of the tether 916 shown in the illustrated example are a unitary structure and the arms 922 and 924 are driven by the same input gear 918. The first arm 922 is positioned between the face gear 742a of the pericyclic motion converter 902 and the face gear 750 of the output shaft gear 718. The second arm 924 is positioned between the face gear 738b of the pericyclic motion converter 904 and the face gear 752 of the output shaft gear 720. In operation, the tether 916 does not interfere with the operation of the pericyclic motion converters 902 and 904 as the pericyclic motion converters 902 and 904 wobble about the respective wobble points 732 and 734 because the first arm 922 passes through an open or unmeshed side 926 between the face gear 742a of the pericyclic motion converter 902 and the face gear 750 of the output shaft gear 718 and the second arm 924 of the tether 916 passes through an open or unmeshed side 928 between the face gear 738b of the pericyclic motion converter 904 and the face gear 752 of the output shaft gear 720. The pericyclic motion converters 902 and 904 always provide the respective open meshes 926 and 928 because the wobble of the respective pericyclic motion converters 902 and 904 completes a cycle once during each revolution of the carrier 906.

The first carrier 906a supports a first pair of bearings 930 and a second pair of bearings 932. Similarly, the second carrier 906b supports a first pair of bearings 934 and a second pair of bearings 936. The first pair of bearings 930 and 934 and the second pair of bearings 932 and 936 of the illustrated example are tapered roller bearings. In the illustrated example, the first pair of bearings 930 is positioned between (e.g., an inner surface of) the first pericyclic motion converter 902 and (e.g., an outer surface of) the first carrier 906a. The second pair of bearings 932 is positioned between (e.g., an inner surface of) the first carrier 906a and (e.g., an outer surface of) the output shaft 910. Likewise, the first pair of bearings 934 is positioned between (e.g., an inner surface of) the pericyclic motion converter 904 and (e.g., an outer surface of) the second carrier 906b. The second pair of bearings 936 is positioned between (e.g., an inner surface of) the second carrier 906b and (e.g., an outer surface of) the output shaft 910. The first pair of the bearings 930 imparts a wobble motion to the pericyclic motion converter 902 to enable the pericyclic motion converter 902 to wobble about the wobble point 732 and the first pair of the support bearings 934 imparts a wobble motion to the pericyclic motion converter 904 to enable the pericyclic motion converter 904 to wobble about the wobble center point 734. For example, the first pairs of bearings 930 and/or 934 are positioned or angled relative to the longitudinal axis 760 of the output shaft 910 to enable the pericyclic motion converters 902 and 904 to wobble about the respective wobble points 732 and 734 plus or minus 6 degrees relative to the longitudinal axis 760.

The first pairs of bearings 930 and 934 and the second pairs of bearings 932 and 936 can sustain radial, axial and moment loading caused by gear meshes 756a-b, 762a-b, 764a-b and 766a-b when used in pairs as set forth in FIG. 9. For example, radial and moment loads generated by gear meshes 756a-b, 762a-b, 764a-b and 766a-b are transferred through the first pairs of bearings 930 and 934 to the respective first and second carriers 906a and 906b and through the second pairs of bearings 932 and 936 and to the output shaft 910. Additionally or alternatively, moments or loads generated by, for example, the gear meshes 956a, 962a, 964a and 966a (e.g., the pericyclic motion converter 902) that are transferred to the output shaft 910 via the first and second bearings 930 and 932 and the first carrier 906a are balanced against opposing moments or loads generated by, for example, the gear meshes 956b, 962b, 964b, and 966a (e.g., the pericyclic motion converter 904) that are transferred to the output shaft 910 via the first and second bearings 932 and 936 and the second carrier 906b.

Figure 10:
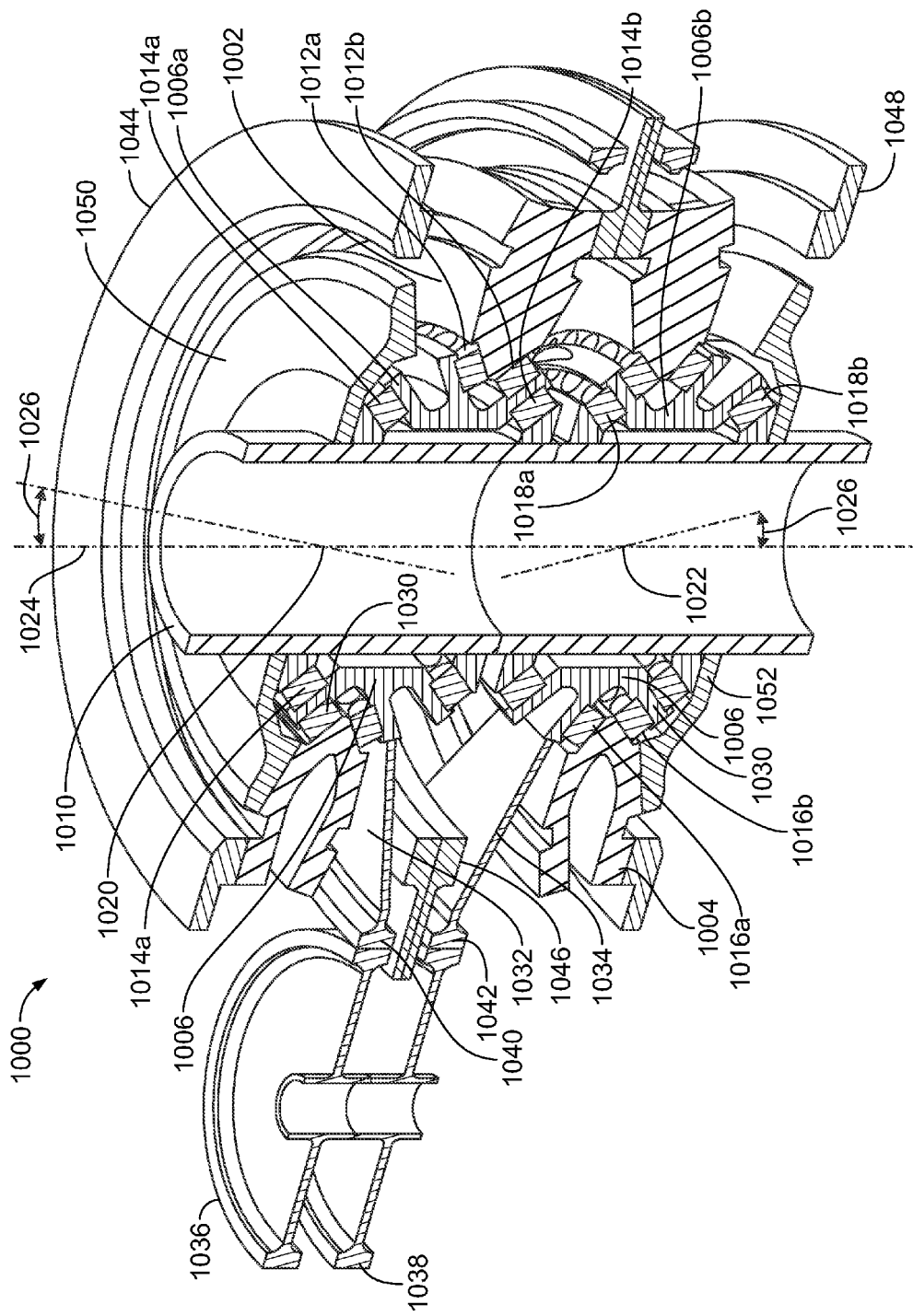
FIG. 10 is a cross-sectional perspective view of another example transmission constructed in accordance with the teachings of this disclosure.

FIG. 10 depicts another example power transmission 1000 constructed in accordance with the teachings of this disclosure. The example power transmission 1000 may be used to implement the transmission 110 of FIG. 1. The example transmission 1000 includes pericyclic motion converters 1002 and 1004 that transfer power between a carrier 1006 and an output shaft 1010. The carrier 1006 of the illustrated example includes a first carrier 1006a corresponding to the pericyclic motion converter 1002 and a second carrier 1006b corresponding to the pericyclic motion converter 1004. The first carrier 1006a supports a first pair of bearings 1012a and 1012b and a second pair of bearings 1014a and 1014b. Similarly, the second carrier 1006b supports a first pair of bearings 1016a and 1016b and a second pair of bearings 1018a and 1018b. The first pair of bearings 1012a-b and 1014a-b and the second pair of bearings 1016a-b and 1018a-b of the illustrated example are tapered roller bearings. For example, the first bearings 1012a are a plurality of tapered roller bearings provided in a ring pattern that surrounds the output shaft 1010 (i.e., the output shaft 1010 passes through a center or opening of the ring). The bearings 1012b, 1014a-b, 1016a-b and 1018a-b are also a plurality of bearings provided in ring pattern or configurations that surround or encompass the output shaft 1010.

The first pair of the bearings 1012a-b imparts a wobble motion to the pericyclic motion converter 1002 to enable the pericyclic motion converter 1002 to wobble about a wobble center point 1020 and the first pair of the bearings 1016a-b imparts a wobble motion to the pericyclic motion converter 1004 to enable the pericyclic motion converter 1004 to wobble about the wobble center point 1022. For example, the first pairs of bearings 1012a-b and/or 1016a-b are positioned or angled relative to a longitudinal axis 1024 of the output shaft 1010 to enable the pericyclic motion converters 1002 and 1004 to wobble about the respective wobble center points 1020 and 1022 at an angle 1026 (e.g., of between approximately plus or minus 4 to 6 degrees) relative to the longitudinal axis 1024. In particular, the first pair of bearings 1012a-b is positioned between the first pericyclic motion converter 1002 and the first carrier 1006a. The second pair of bearings 1014a-b is positioned between the first carrier 1006a and the output shaft 1010. Likewise, the first pair of bearings 1016a-b is positioned between the second pericyclic motion converter 1004 and the second carrier 1006b. The second pair of bearings 1018a-b is positioned between the second carrier 1006b and the output shaft 1010. The first and second carriers 1006a-b and/or the pericyclic motion converters 1002 and 1004 include support surfaces 1030 (e.g., angled or tapered support surfaces) to properly orient the respective first and second pairs of bearings 1012a-b, 1014a-b, 1016a-b and 1018a-b. For example, the respective surfaces of the first and second carriers 1006a and 1006b and/or the pericyclic motion converters 1002 and 1004 may be configured to orient the first pairs of bearings 1012a-b and 1016a-b (e.g., relative to the longitudinal axis 1024) to mount the pericyclic motion converters 1002 and 1004 at the respective nutation angles 1026 such that the pericyclic motion converters 1002 and 1004 wobble about the respective wobble points 1020 and 1022.

To rotate and/or drive the first and second carriers 1006a-b, the example transmission 1000 includes a first tether or link 1032 and a second tether or link 1034. Specifically, the first tether 1032 operatively couples the first carrier 1006a to a first input gear 1036 and the second tether 1034 operatively couples the second carrier 1006b to a second input gear 1038. An outer peripheral portion 1040 of the first tether 1032 is a face gear that enmeshes with the first input gear 1036 and an outer peripheral 1042 of the second tether 1034 is a second input gear that enmeshes with the second input gear 1038. Similar to the tether 916 of FIG. 9, the first and second tethers 1032 and 1034 do not interfere with the operation of the pericyclic motion converters 1002 and 1004 because the first and second tethers 1032 and 1034 pass through unmeshed portions of the pericyclic motion converters 1002 and 1004 in operation.

Figure 11:
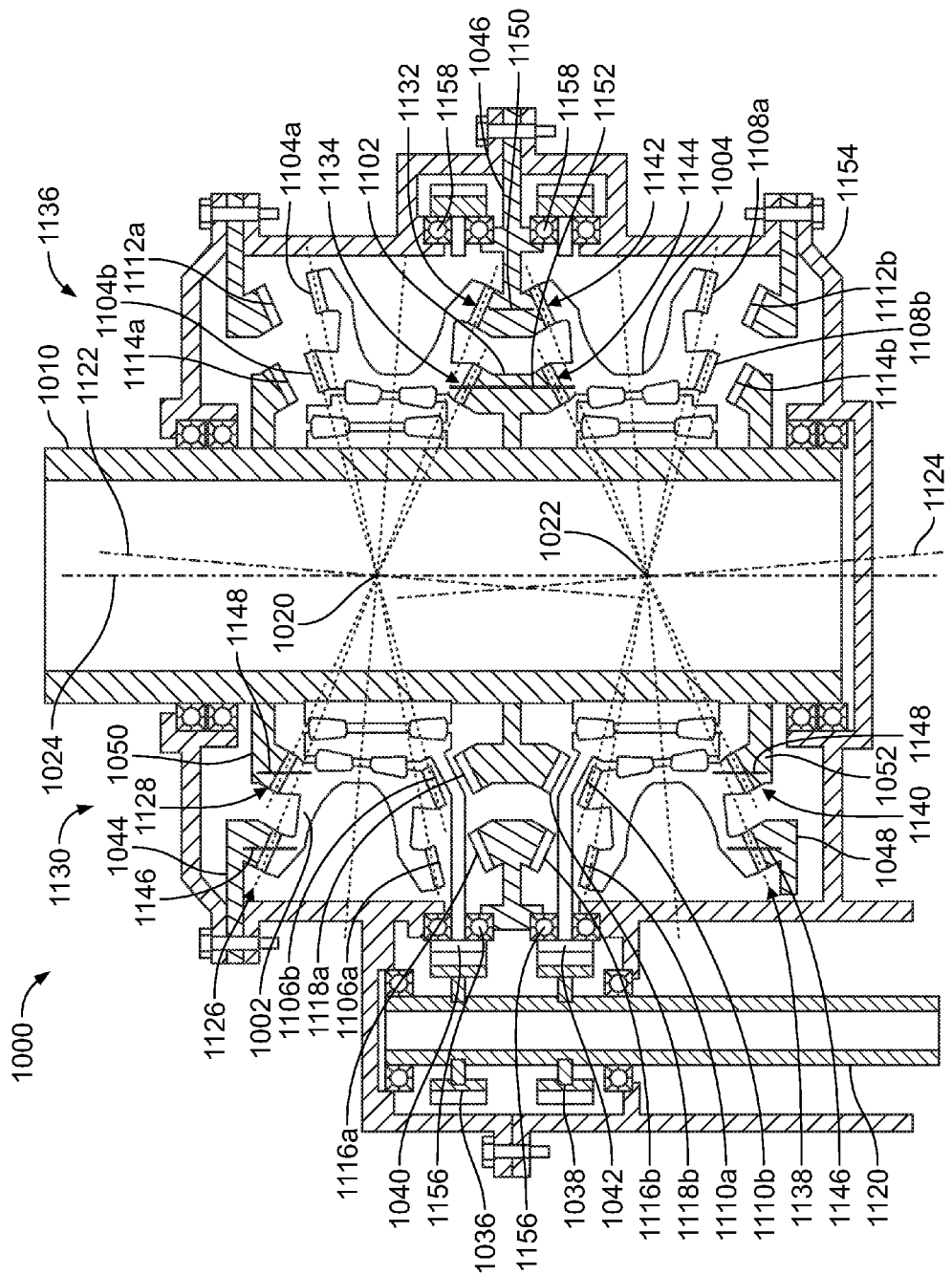
FIG. 11 is a cross-sectional view of the example transmission of FIG. 10.

Unlike the example transmission disclosed above, the example transmission 1000 of the illustrated example includes reaction control members 1044, 1046, and 1048. In particular, the example transmission 1000 employs an intermediate reaction control member 1046 positioned between the first and second pericyclic motion converters 1002 and 1004. More specifically, the intermediate reaction control member 1046 is positioned between the opposing first and second tethers 1032 and 1034. Furthermore, unlike the example transmissions disclosed above, the example gear tooth and/or gear face orientation of the reaction control members 1044, 1046, and 1048, the pericyclic motion converters 1002 and 1004, and/or the output shaft 1006 deviate from conventional gear tooth numbering or determination. For example, conventional design practice for identifying a cone angle and/or pitch angle is dependent on tooth numbering determination to determine cone angles and reductions ratio for the system. This results in gear pair configurations where the member with larger numbers of teeth form gears with an internal cone angle (less than 90 degrees from the axis of rotation) and smaller numbers of teeth form gears with an external cone angle (greater than 90 degrees from the axis of rotation), In the illustrated example, cone angles and gear teeth numbering determination of each of the reaction control members 1044, 1046, and 1048, the pericyclic motion converters 1002 and 1004, and/or the output shaft 1006 is not determined by that standard design practice but takes advantage of the design flexibility of face gears, where the tooth orientation can be tilted with respect to cone angle and non-standard cone angles can be used. In some examples, such configuration is employed via face gears. In FIG. 11, a similar gear configuration is schematically represented with cone angles shown as they would appear using, for example, standard design practice and bevel gears. Thus, in some examples, the tooth numbering determination deviates from known methods.

To transfer power between the carriers 1006a-b and the output shaft 1010, the pericyclic motion converter 1002 interacts, engages or enmeshes with the reaction control members 1044 and 1046, an output shaft gear 1050 and an intermediate output shaft gear 1102 (FIG. 11). The output shaft gear 1102 is not shown in FIG. 10. Likewise, the pericyclic motion converter 1004 interacts, engages or enmeshes with the respective reaction control members 1046 and 1048, the intermediate output gear shaft 1102 and an output shaft gear 1052. The first tether 1032 passes through an opening formed between an unmeshed portion of the reaction control member 1046 and the first pericyclic motion converter 1002 and an opening formed between an unmeshed portion between the first pericyclic motion converter 1002 and the intermediate output shaft gear 1102. The second tether 1034 passes through an opening formed between an unmeshed portion of the reaction control member 1046 and the pericyclic motion converter 1004 and an opening formed between an unmeshed portion between the second pericyclic motion converter 1004 and the intermediate output shaft gear 1102.

FIG. 11 is cross-sectional view of the example transmission 1000 of FIG. 10. The multi-enmeshing or engaging points of contact between the pericyclic motion converters 1002 and 1004 and the respective reaction control members 1044, 1046 and 1048 and the respective output shaft gears 1050, 1052 and 1102 cancel, reduce and/or offset at least some of forces or moments generated when the pericyclic motion converters 1002 and 1004 enmesh and/or engage the respective reaction control members 1044, 1046 and 1048 and the respective output shaft gears 1050, 1052 and 1102.

To provide the multi-meshing or multiple points of contact, the pericyclic motion converter 1002 of the illustrated example includes face gears 1104a-b that are oriented in a direction that is opposite an orientation of the face gears 1106a-b. Similarly, the pericyclic motion converter 1004 of the illustrated example includes face gears 1108a-b that are on opposite sides of face gears 1110a-b. The reaction control members 1044 and 1048 include face gears 1112a-b, respectively. Additionally, the output shaft gears 1050 and 1052 include face gears 1114a-b, respectively. The intermediate reaction control member includes a face gear 1116a that is on a first side of the intermediate reaction control member 1046 and a second face gear 1116b that is on a second side of the intermediate reaction control member 1046 opposite the first side. The intermediate output shaft gear 1102 includes a face gear 1118a on a first side of the intermediate output shaft gear 1102 and a second face gear 1118b on a second side of the intermediate output shaft gear 1102 opposite the first side. In the illustrated example, the face gears 1104a, 1104b, 1110a, 1110b, 1112b, 1114b 1116a, and 1118a are oriented in an upward direction in the orientation of FIG. 11, and the face gears 1106a, 1106b, 1108a, 1108b, 1112b, 1114b, 1116b and 1118b are oriented in a downward direction in the orientation of FIG. 11.

In operation, the input gears 1036 and 1038 are driven via an input shaft 1120 (driven via an engine). In turn, the first tether 1032 is rotated about the longitudinal axis 1024 via engagement of the gear 1040 and the input gear 1036, and the second tether 1034 is rotated about the longitudinal axis 1024 via engagement with the gear 1042 and the second input gear 1038. The first tether 1032 rotates or drives the first carrier 1006a about the longitudinal axis 1024 and the second tether 1034 rotates or drives the second carrier 1006b about the longitudinal axis 1024. The first and second carriers 1006a and 1006b impart a wobbling motion to the respective pericyclic motion converters 1002 and 1004 via, for example, the respective first pair of bearings 1012a-b and 1016a-b. As a result, the first pair of bearings 1012a-b causes the pericyclic motion converter 1002 to rotate about a rotational axis 1122 and wobble about the wobble center point 1020. Similarly, the first pair of bearings 1016a-b causes the pericyclic motion converter 1004 to rotate about a rotational axis 1124 and wobble about the wobble center point 1022.

As the pericyclic motion converter 1002 rotates about the axis of rotation 1122 and wobbles relative to the wobble center point 1020, a portion or segment of the first face gear 1104a of the first pericyclic motion converter 1002 engages or enmeshes with a portion or segment of the face gear 1112a of the reaction control member 1044 to provide a gear mesh 1126 and a portion or segment of the second face gear 1104b of the first pericyclic motion converter 1002 engages or enmeshes with a portion or segment of the first face gear 1114a of the output shaft gear 1050 to provide a gear mesh 1128 on a first side 1130 of the longitudinal axis 1024. Additionally, the face gear 1106a of the pericyclic motion converter 1002 engages the face gear 1116a of the reaction control member 1046 to provide a gear mesh 1132 and the face gear 1106b of the pericyclic motion converter 1002 engages or enmeshes with the face gear 1118a of the output shaft gear 1102 to provide a gear mesh 1134 on a second side 1136 of the longitudinal axis 1024. Further, the face gears 1106a and 1106b of the pericyclic motion converter 1002 are spaced from or disengaged from the respective face gears 1116a and 1118a of the respective intermediate reaction control member 1046 and the output shaft gear 1102 along the first side 1130 of the longitudinal axis 1024 to enable the first tether 1032 to pass therebetween, and the face gears 1104a and 1104b of the pericyclic motion converter 1002 are disengaged from or unmeshed with the face gears 1112a and 1114a of the respective reaction control member 1044 and the output shaft gear 1050 along the second side 1136 of the longitudinal axis 1024.

Similarly, as the pericyclic motion converter 1004 rotates about the rotational axis 1124 and wobbles relative to the wobble center point 1022, a portion or segment of the first face gear 1108a of the second pericyclic motion converter 1004 engages or enmeshes with a portion or segment of the face gear 1112b of the reaction control member 1048 to provide a gear mesh 1138 and a portion or segment of the second face gear 1108b of the second pericyclic motion converter 1004 engages or enmeshes with a portion or segment of the face gear 1114b of the output shaft gear 1052 to provide a gear mesh 1140 on the first side 1130 of the longitudinal axis 1024. Additionally, the face gear 1110a of the pericyclic motion converter 1004 engages the face gear 1116b of the reaction control member 1046 to provide a gear mesh 1142 and the face gear 1110b of the pericyclic motion converter 1004 engages or enmeshes with the face gear 1118b of the output shaft gear 1102 to provide a gear mesh 1144 on the second side 1136 of the longitudinal axis 1024. Further, the face gears 1110a and 1110b of the pericyclic motion converter 1004 are spaced from or disengaged from the respective face gears 1116b and 1118b of the respective reaction control member 1046 and the output shaft gear 1102 along the first side 1130 of the longitudinal axis 1024 to enable the second tether 1034 to pass therebetween, and the face gears 1108a and 1108b of the pericyclic motion converter 1004 are disengaged or unmeshed with the face gears 1112b and 1114b of the respective reaction control member 1048 and the output shaft gear 1052 along the second side 1136 of the longitudinal axis 1024.

More specifically, as shown in FIG. 11, the gear mesh 1126 is substantially aligned (e.g., substantially vertically) relative to the gear mesh 1138 along a line of contact 1146, the gear mesh 1128 is substantially aligned (e.g., substantially vertically) relative to the gear mesh 1140 along a line of contact 1148, the gear mesh 1132 is substantially aligned (e.g., substantially vertically) relative to the gear mesh 1142 along a line of contact 1150, and the gear mesh 1134 is substantially aligned (e.g., substantially vertically) relative to the gear mesh 1144 along a line of contact 1152. The lines of contact 1146-1152 follow the wobble movement of the respective pericyclic motion converters 1002 and 1004 as they wobble about the respective wobble center points 1020 and 1022.

As a result, the orientation and/or position of the gear meshes 1126, 1128, 1132, 1134, 1138, 1140, 1142 and 1144 enable at least some of the gear forces and/or moments generated by the gear meshes 1126, 1128, 1132, 1134, 1138, 1140, 1142 and 1144 to be reduced and/or canceled. For example, tangential, axial, radial and/or moment forces generated by the gear mesh 1126 may be reduced or offset by tangential, axial, radial and/or moment forces generated by the gear mesh 1128. For example, tangential, axial, radial and/or moment forces generated by the gear mesh 1132 may be reduced or offset by tangential, axial, radial and/or moment forces generated by the gear mesh 1134. For example, tangential, axial, radial and/or moment forces generated by the gear mesh 1138 may be reduced or offset by tangential, axial, radial and/or moment forces generated by the gear mesh 1140. For example, tangential, axial, radial and/or moment forces generated by the gear mesh 1142 may be reduced or offset by tangential, axial, radial and/or moment forces generated by the gear mesh 1144. Additionally or alternatively, for example, tangential, axial, radial and/or moment forces generated by the gear meshes 1126 and 1128 may be reduced or offset by tangential, axial, radial and/or moment forces generated by the respective gear meshes 1138 and 1140. Similarly, for example, tangential, axial, radial and/or moment forces generated by the gear meshes 1132 and 1134 may be reduced or offset by tangential, axial, radial and/or moment forces generated by the respective gear meshes 1142 and 1144. For example, in some instances tangential, axial, radial and/or moment forces generated by the gear meshes 1126, 1128, 1132, and 1134 may be transmitted to the output shaft 1010 via the bearings 1012*a-b* and/or 1014*a-b* and offset or canceled via opposing tangential, axial, radial and/or moment forces generated by the gear meshes 1138, 1140, 1142, and 1144 that may be transmitted to the output shaft 1010 via the bearings 1016*a-b* and/or 1018*a-b*.

Further, because the first and second pericyclic motion converters 1002 and 1004 are out of phase (i.e., the rotational axes 1122 and 1124 are on opposite sides of the longitudinal axis 1024), the pericyclic motion converters 1002 and 1004 are self-balancing. In other words, moments and vibrations generated by each of the pericyclic motion converters 1002 and 1004 are equal in magnitude and opposite in direction. Thus, the power transmission 1000 of the illustrated example does not require auxiliary balancing elements (e.g., counter weights). For example, the dual pericyclic motion converters 1002 and 1004 eliminate use of counter weights that might otherwise be necessary to eliminate dynamic imbalance caused by nutation motion of the pericyclic motion converters 1002 and 1004. For example, the pericyclic motion converters 1002 and 1004 overcome the dynamic imbalance via thrust force cancellation.

In the illustrated example, the reaction control members 1044, 1046, and 1048 are mounted or fixed to a housing 1154 of the transmission 1000. The intermediate reaction control member 1046 is supported relative to the housing 1154 via bearings 1156 and 1158. The bearings 1156 also support the first and second tethers 1032 and 1034 relative to the housing 1154.

Figure 12:
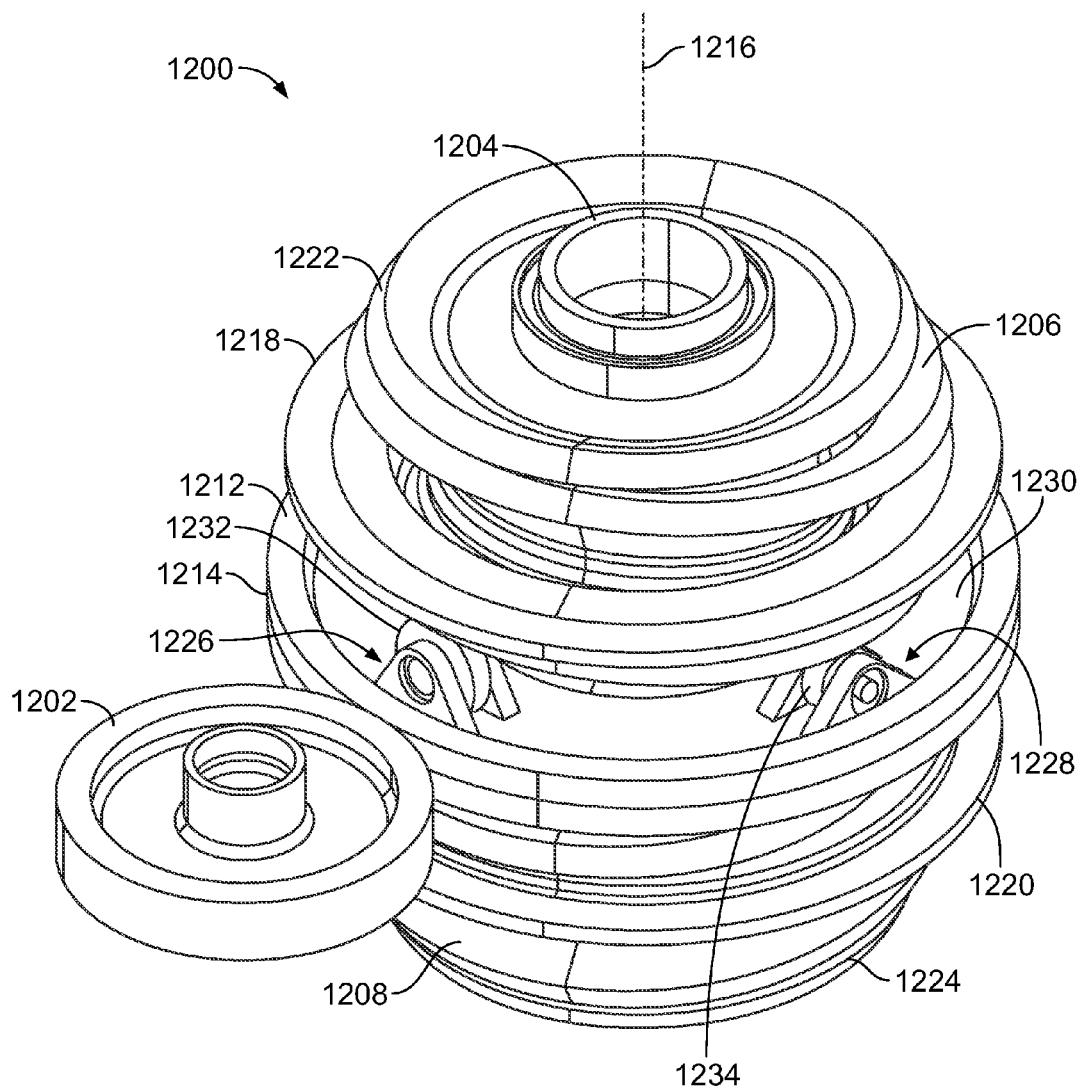
FIG. 12 is a perspective view of another example transmission constructed in accordance with the teachings of this disclosure.

FIG. 12 illustrates another example transmission 1200 constructed in accordance with the teachings disclosed herein. The example power transmission 1200 may be used to implement the transmission 110 of FIG. 1. The example power transmission 1200 of the illustrated example receives power via input gear 1202 operatively coupled to an engine (e.g., the engine 106 of FIG. 1) and an output shaft 1204 to drive an output member such as, for example, the rotor system 102 of the example aircraft of FIG. 1. The example transmission 1200 includes pericyclic motion converters 1206 and 1208 that transfer power between the input gear 1202 and the output shaft 1204. A carrier 1212 of the transmission 1200 transfers power from the input gear 1202 to the pericyclic motion converters 1206 and 1208. Specifically, a peripheral face gear 1214 of the carrier 1212 engages or enmeshes with the input gear 1202, which causes the carrier 1212 to rotate about a longitudinal axis 1216 of the output shaft 1204. The pericyclic motion converters 1206 and 1208 interact, engage or enmesh with respective reaction control members 1218 and 1220 and respective output shaft gears 1222 and 1224 to rotate the output shaft 1204.

In particular, the carrier 1212 of the illustrated example includes a first bearing assembly 1226 and a second bearing assembly 1228 spaced from the first bearing assembly 1226 (e.g., a spacing of approximately 90 degrees). In the illustrated example, a first pair of rollers 1232 induces a wobble motion to the pericyclic motion converters 1206 and 1208. A second pair of rollers 1234 help support the pericyclic motion converters 1206 and 1208 as the pericyclic motion converters 1206 and 1208 enmesh or separate engagement with the respective reaction control members 1218 and 1220 and/or the output shaft gears 1222 and 1224. The first and second bearing assemblies 1226 and 1228 of the illustrated example extend or protrude from a web 1230 of the carrier 1212. Additionally, the first and second bearing assemblies 1226 and 1228 of the illustrated example are positioned adjacent the peripheral face gear 1214 (e.g., positioned closer to the peripheral face gear 1214 than a center portion or longitudinal axis 1216). The first bearing assembly 1226 includes a first pair of rollers 1232 and the second bearing assembly 1228 includes a second pair of rollers 1234. The first pair of rollers 1232 has a diameter that is larger than a diameter of the second pair of rollers 1234. Additionally, the second pair of rollers 1234 has a conical shape because the second pair of rollers 1234 engage or mate with respective pericyclic motion converters 1206 and 1208 at a location where a distance between the pericyclic motion converters 1206 and 1208 and angles of the respective pericyclic motion converters 1206 and 1208 are different than angles of the pericyclic motion converters 1206 and 1208 when engaged by the first pair of rollers 1232.

Figure 13:
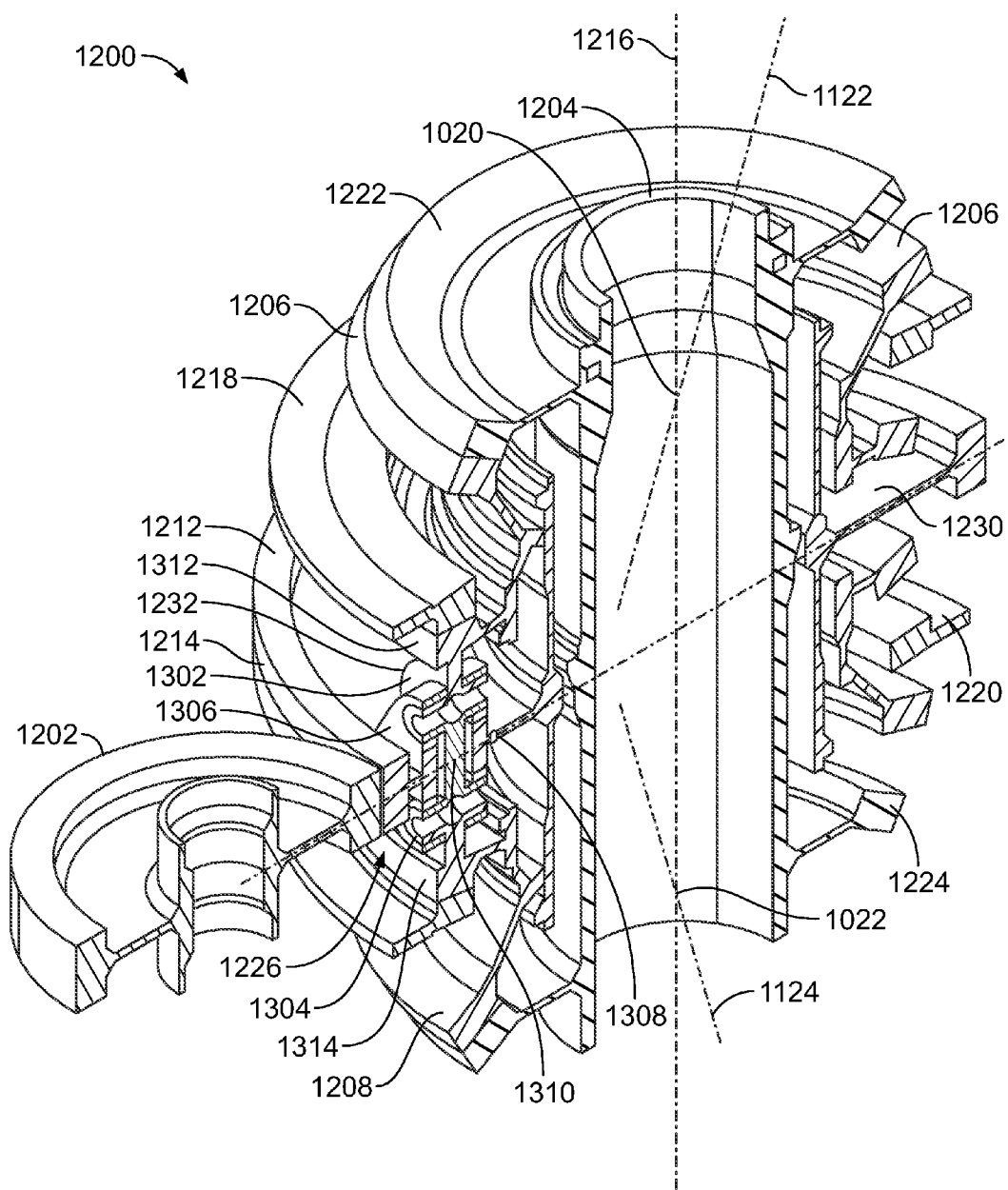
FIG. 13 is a cross-sectional perspective view of the example transmission of FIG. 12.

FIG. 13 is a cross-sectional, perspective view of the example transmission 1200 of FIG. 12. Those components of the example transmission 1200 that are substantially similar or identical to the components of the example transmission 1000 of FIGS. 10 and 11 and that have functions substantially similar or identical to the functions of those components will not be described in detail again below. Instead, the interested reader is referred to the above corresponding descriptions. To facilitate this process, similar reference numbers will be used for like structures. For example, the pericyclic motion converters 1206 and 1208 rotate about respective rotational axes 1122 and 1124 and wobble relative to respective wobble center points 1020 and 1022. The pericyclic motion converters 1206 and 1208 wobble out of phase relative to each other to balance the transmission 1200 and offset and/or cancel vibrations during operation.

Figure 14:
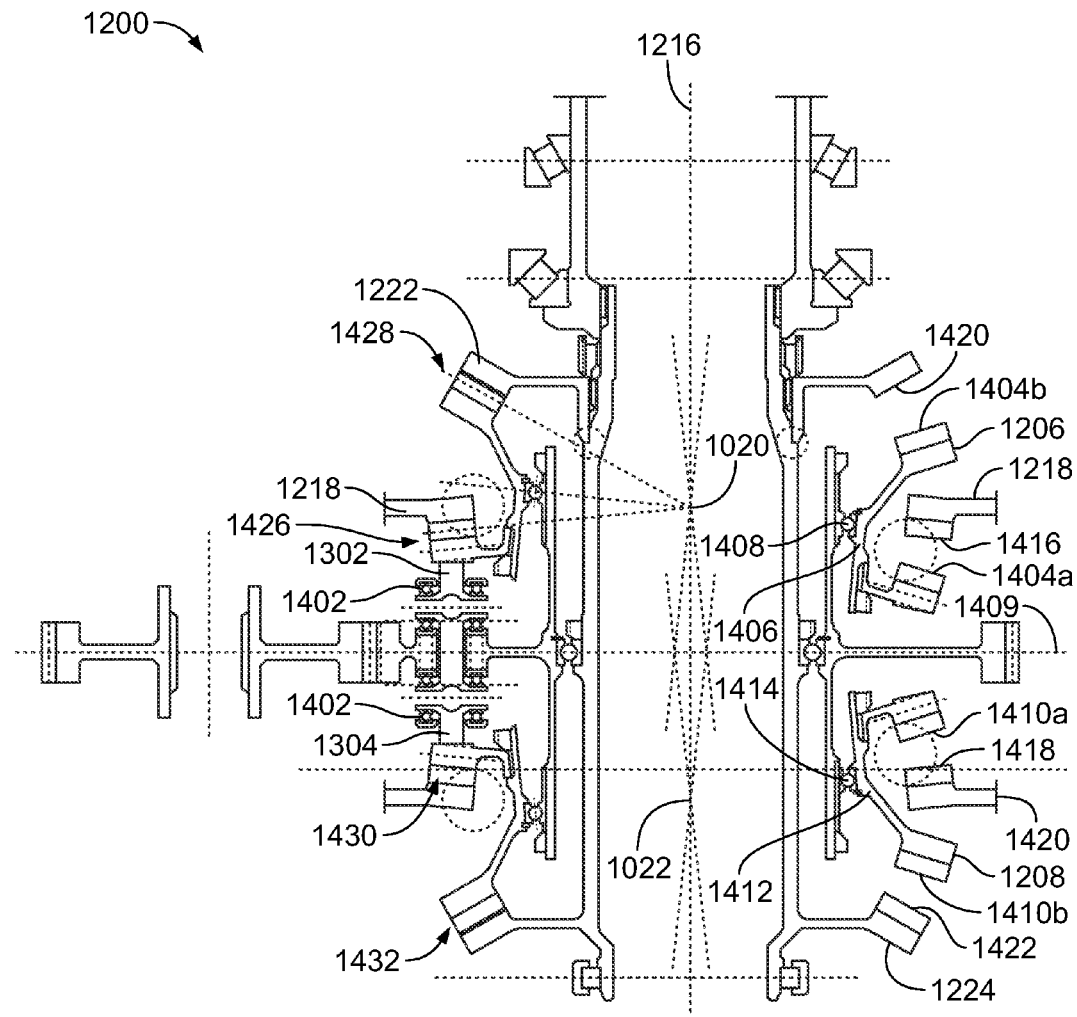
FIG. 14 is a cross-sectional view of the example transmission of FIGS. 12 and 13.

The first bearing assembly 1226 or the first pair of roller bearings 1232 includes a first roller 1302 and a second roller 1302 opposite the first roller 1302. The rollers 1302 and 1304 are mounted to the carrier 1212 via brackets 1306 and/or bearings 1402 (FIG. 14). Specifically, the web 1230 has an opening or through hole 1308 to enable the roller 1302 to directly engage or contact the roller 1304 at a contact point 1310 (e.g., at a center plane of the bearing assembly 1226) and enable the rollers 1302 and 1304 to roll against each other (e.g., at the center plane) during operation. Although not shown, the second bearing assembly 1228 (FIG. 12) is mounted to the carrier 1212 substantially similar to the first bearing assembly 1226 and the second pair of roller bearings 1234 includes rollers oriented substantially similar to the orientation of the rollers 1302 and 1304. The roller 1302 is substantially aligned or positioned to engage a rim or portion 1312 of the pericyclic motion converter 1206 and the roller 1304 is substantially aligned with or positioned to engage a rim or portion 1314 of the pericyclic motion converter 1208. The rollers 1302 and 1304 roller against each other so that they are effectively loading the pericyclic motion converter 1206 separating force against the separating force of the pericyclic motion converter 1208. In particular, the rollers 1302 and 1304 of the illustrated example roll against each other with substantially the same velocity so that no sliding motion occurs between the rollers 1302 and 1304 at the contact point 1310 and/or at a contact point between the roller 1302 and the rim 1312 or at a contact point between the roller 1304 and the rim 1314.

FIG. 14 is a cross-sectional view of the example transmission 1200 of FIGS. 12 and 13. In the illustrated example, the pericyclic motion converter 1206 includes a first face gear 1404a and a second face gear 1404b. The face gears 1404a and 1404b are connected via an arm 1406 that pivots or wobbles the face gears 1404a and 1404b relative to the wobble center point 1020 via a bearing 1408. The face gears 1404a and 1404b are each provided at an angle relative to a reference 1409 (e.g., a horizontal reference) and are oriented toward the output shaft gear 1222 (e.g., an upward direction in the orientation of FIG. 14). Similarly, the pericyclic motion converter 1208 includes a first face gear 1410a and a second face gear 1410b. The face gears 1410a and 1410b are connected via an arm 1412 that pivots or wobbles the face gears 1410a and 1410b relative to the wobble center point 1022 via a bearing 1414. The face gears 1410a and 1410b are each provided at an angle relative to a reference 1409 (e.g., a horizontal reference) and are oriented toward the output shaft gear 1224 (e.g., a downward direction in the orientation of FIG. 14). The reaction control member 1218 of the illustrated example includes a face gear 1416 and the reaction control member 1220 includes a face gear 1418 that are angled similarly to (e.g., matably engage) the respective face gears 1404a and 1410a. The reaction control members 1218 and 1220 are fixed to a housing of the transmission 1200. The face gear 1416 is oriented toward the output shaft gear 1224 (e.g., a downward direction in the orientation of FIG. 14) and the face gear 1418 is oriented toward the output shaft gear 1222 (e.g., an upward direction in the orientation of FIG. 14). The output shaft gear 1222 has a face gear 1420 and the output shaft gear 1224 has a face gear 1422 that are angled similarly to (e.g., matably engage) the respective face gears 1404b and 1410b. The face gear 1420 is oriented toward the output shaft gear 1224 (e.g., a downward direction in the orientation of FIG. 14) and the face gear 1422 is oriented toward the output shaft gear 1222 (e.g., an upward direction in the orientation of FIG. 14).

The first roller 1302 imparts or induces a wobble motion into the pericyclic motion converter 1206. To induce wobbling, the first roller 1302 has a diameter large enough to provide a force that thrusts the face gear 1404a of the pericyclic motion converter 1206 into mesh with the face gear 1416 of the reaction control member 1218 to provide a gear mesh 1426. In particular, only a segment (e.g., a portion of the entire circumference) of the face gear 1404a of the pericyclic motion converter 1206 engages the face gear 1416 of the reaction control member 1218. Additionally, because the face gear 1404b of the pericyclic motion converter 1206 is coupled to the face gear 1404a via the arm 1406 pivotal about the bearing 1408, the face gear 1404b engages or enmeshes with the face gear 1420 of the output shaft gear 1222 to provide a gear mesh 1428 when the face gear 1404a is thrust into engagement with the face gear 1416. The gear mesh 1426 is substantially aligned with the gear mesh 1428 (e.g. in a radial/horizontal direction relative to the longitudinal axis 1216). Thus, the gear mesh 1426 and 1428 are on the same side of the longitudinal axis 1216.

The second roller 1304 imparts or induces a wobble motion into the pericyclic motion converter 1208. To induce wobbling, the second roller 1304 has a diameter large enough to provide a force that thrusts the face gear 1410a of the pericyclic motion converter 1208 into mesh with the face gear 1418 of the reaction control member 1220 to provide a gear mesh 1430. In particular, only a segment (e.g., a segment of the entire circumference) of the face gear 1410a of the pericyclic motion converter 1208 engages the face gear 1418 of the reaction control member 1220. Additionally, because the face gear 1410b of the pericyclic motion converter 1208 is coupled to the face gear 1410a via the arm 1412 pivotal about the bearing 1414, the face gear 1410b engages or enmeshes with the face gear 1422 of the output shaft gear 1224 to provide a gear mesh 1432 when the face gear 1410a is thrust into engagement with the face gear 1418. The gear mesh 1430 is substantially aligned with the gear mesh 1432 (e.g. in a radial/horizontal direction relative to the longitudinal axis 1216). Thus, the gear mesh 1430 and 1432 are on the same side of the longitudinal axis 1216. Additionally, the gear mesh 1426 of the illustrated example is aligned with the gear mesh 1430 and the gear mesh 1428 is aligned with the gear mesh 1432.

Referring to FIGS. 12-14, in operation, the first and second bearing assemblies 1226 and 1228 rotate with the carrier 1212 as the carrier 1212 rotates about the longitudinal axis 1216. In some instances, the tangential forces provided by the gear meshes 1426-1432 react through and/or travel around the respective peripheral rims 1312 and 1314 of the pericyclic motion converters 1206 and 1208. In some instances, these tangential forces may be large enough to cause the entire pericyclic motion converters 1206 and 1208 to deflect and/or separate engagement between the pericyclic motion converters 1206 and 1208 and the respective reaction control members 1218 and 1220 and/or the output shaft gears 1222 and 1224. However, the first and second rollers 1302 and 1304 engagement adjacent the respective peripheral edges 1312 and 1314 react, absorb, and/or otherwise reduce the tangential forces to prevent separation of the pericyclic motion converters 1206 and 1208 and the respective reaction control members 1218 and 1220 and/or the output shaft gears 1222 and 1224.

For example, the first roller bearing 1302 imparts an upward force in the orientation of FIG. 14 where the first roller 1302 contacts the pericyclic motion converter 1206 adjacent the rim 1312 causing the pericyclic motion converter 1206 to wobble relative to the wobble center point 1020. Further, the upward force react a separating force generated by the gear meshes 1426 and 1428. Additionally, because the gear meshes 1426 and 1428 are on the same side or slightly offset laterally relative to the longitudinal axis 1216, the tangential forces created at the gear meshes 1426 and 1428 reduce and/or somewhat offset given that the tangential loads are in the same direction. Further, the second bearing assembly 1228 counters moments (e.g., moments along a y-direction) created by overturning moments to accelerate the pericyclic motion converter inertia and tangential loading at the gear meshes 1426 and 1428.

Similarly, the second roller bearing 1304 imparts an downward force in the orientation of FIG. 14 where the second roller 1304 contacts the pericyclic motion converter 1208 adjacent the rim 1314 causing the pericyclic motion converter 1208 to wobble relative to the wobble center point 1022. Further, the downward force react a separating force generated by the gear meshes 1430 and 1432. Additionally, because the gear meshes 1430 and 1432 are on the same side or slightly offset laterally relative to the longitudinal axis 1216, the tangential forces created at the gear meshes 1430 and 1432 reduce and/or somewhat cancel given that the tangential loads are in the same direction. Further, the second bearing assembly 1228 counters moments (e.g., moments along a y-direction) created by overturning moments imposed on the pericyclic motion converter 1208 to accelerate the pericyclic motion converter via inertia and tangential loading at the gear meshes 1430 and 1432. Further, at least some of the tangential loads, axial loads, radial loads and/or moments generated by the gear meshes 1426-1432 offset, reduce and/or cancel because the gear meshes 1426-1432 are substantially aligned. For example, at least some of the tangential, radial, axial and/or moment loads generated by the gear meshes 1426 and 1428 are opposed or counter balanced with tangential, radial, axial and/or moment loads generated by the gear meshes 1430 and 1432 via the output shaft 1204.

In some examples, more than one bearing assembly 1226 and/or 1228 may be provided. For example, a transmission may include a carrier and a pericyclic motion converter that includes a bearing assembly 1226 to enmesh the face gear 1404a and the face gear 1416 and another bearing assembly 1226 to enmesh the face gear 1404b and 1420.

At least some of the aforementioned examples include one or more features and/or benefits including, but not limited to, the following:

In some examples, a transmission includes a first pericyclic motion converter having a first aperture to receive at least a portion of an output shaft and a second pericyclic motion converter having a second aperture to receive at least a portion of the output shaft. A first bearing is positioned between an inner surface of the first pericyclic motion converter defined by the first aperture and an outer surface of the output shaft. A second bearing is positioned between an inner surface of the second pericyclic motion converter defined by the second aperture and the outer surface of the output shaft.

In some examples, the first bearing or the second bearing includes a spherical uniball bearing.

In some examples, the first bearing or the second bearing includes a spherical roller bearing.

In some examples, a carrier imparts rotational motion to the first and second pericyclic motion converters.

In some examples, a first pericyclic bearing is positioned between an outer surface of first pericyclic motion converter and an inner surface of the carrier. The first pericyclic bearing is positioned to provide a first nutating angle to the first pericyclic motion converter.

In some examples, a second pericyclic bearing is positioned between an outer surface of second pericyclic motion converter and the inner surface of the carrier. The second pericyclic bearing is positioned to provide a second nutating angle to the second pericyclic motion converter.

In some examples, the first bearing includes a first roller bearing to impart a wobble motion to the first pericyclic motion converter and a second roller bearing to react loads from a gear mesh of the first pericyclic motion converter to the output shaft.

In some examples, a first carrier is positioned between the inner surface of the first pericyclic motion converter and the outer surface of the output shaft, where the first carrier supports the first roller bearing and second roller bearing between the first pericyclic motion converter and the output shaft.

In some examples, a first tether operatively couples the first carrier to an input gear, and the input gear drives the first carrier via the first tether.

In some examples, the second bearing includes a third roller bearing to impart a wobble motion to the second pericyclic motion converter and a fourth roller bearing to react loads from a gear mesh of the second pericyclic motion converter to the output shaft.

In some examples, a second carrier positioned between face gears of the second pericyclic motion converter and the outer surface of the output shaft, where the second carrier supports the third and fourth roller bearings between the second pericyclic motion converter and the output shaft.

In some examples, a second tether operatively couples the second carrier to the input gear, and the input gear drives the second carrier via the second tether.

In some examples, the first and second tethers are a unitary structure.

In some examples, a transmission disclosed herein includes a first pericyclic motion converter and a second pericyclic motion converter. A carrier supports the first and second pericyclic motion converters. The carrier has a first bearing mounting surface, a second bearing mounting surface, a third bearing mounting surface and a fourth bearing mounting surface. The first bearing mounting surface is spaced from the second bearing mounting surface, the third bearing mounting surface is spaced from the fourth bearing mounting surface, and the first and second bearing mounting surfaces oppose the third and fourth bearing mounting surfaces relative to a longitudinal axis of the carrier. A first distance between the first bearing mounting surface and the second bearing mounting surface is greater than a second distance between the third bearing mounting surface and the fourth bearing mounting surface.

In some examples, the first bearing mounting surface includes a first tapered surface and a second tapered surface opposing the first tapered surface.

In some examples, the second bearing mounting surface includes a third tapered surface and a fourth tapered surface opposing the third tapered surface.

In some examples, the third bearing mounting surface includes a fifth tapered surface and a sixth tapered surface opposing the fifth tapered surface.

In some examples, the fourth bearing mounting surface includes a seventh tapered surface and an eighth tapered surface opposing the first tapered surface.

In some examples, a first roller bearing is supported by the first tapered surface of the first bearing mounting surface and the sixth tapered surface of the third bearing mounting surface.

In some examples, a second roller bearing is supported by the second tapered surface of the first bearing mounting surface and the fifth tapered surface of the third bearing mounting surface.

In some examples, a first roller bearing is supported by the third tapered surface of the second bearing mounting surface and the seventh tapered surface of the fourth bearing mounting surface.

In some examples, a second roller bearing supported by the fourth tapered surface of the second bearing mounting surface and the eighth tapered surface of the fourth bearing mounting surface.

In some examples, a transmission disclosed herein includes a first pericyclic motion converter, a second pericyclic motion converter, and a carrier positioned between the first pericyclic motion converter and the second pericyclic motion converter. The carrier defines a web between a peripheral edge of the carrier and an opening to receive an output shaft. A first roller assembly protrudes from the web. The first roller assembly has a first roller to engage the first pericyclic motion converter and a second roller to engage the second pericyclic motion converter.

In some examples, a second roller assembly protruding from the web.

In some examples, the second roller assembly is spaced from the first roller assembly by approximately ninety degrees relative to a longitudinal axis of the output shaft.

In some examples, a diameter of the first roller is greater than a diameter of a third roller of the second roller assembly.

In some examples, the first roller engages a portion of the first pericyclic motion converter adjacent a peripheral edge of the first pericyclic motion converter and the second roller engages a portion of the second pericyclic motion converter adjacent a peripheral edge of the second pericyclic motion converter.

In some examples, the first roller imparts a first force to the first pericyclic motion converter and the second roller imparts a second force to the second pericyclic motion converter, wherein the first force is provided in a first direction and the second force is provided in a second direction opposite the first direction.

In some examples, the first roller contacts the second roller via the opening through the web of the carrier.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A transmission comprising:
   a first pericyclic motion converter, the first pericyclic motion converter having a ring-shaped gear defining a first aperture to receive at least a portion of an output shaft;
   a second pericyclic motion converter, the second pericyclic motion converter having a ring-shaped gear defining a second aperture to receive at least a portion of the output shaft;
   a first bearing positioned between an inner surface defined by the first aperture of the first pericyclic motion converter and an outer surface of the output shaft; and
   a second bearing positioned between an inner surface defined by the second aperture of the second pericyclic motion converter and the outer surface of the output shaft.

2. The transmission as defined in claim 1, wherein the first bearing or the second bearing comprises a spherical uniball bearing.

3. The transmission as defined in claim 1, further comprising a carrier to impart rotational motion to the first and second pericyclic motion converters.

4. The transmission as defined in claim 3, further comprising a first pericyclic bearing positioned between an outer surface of first pericyclic motion converter and an inner surface of the carrier, the first pericyclic bearing positioned to provide a first nutating angle to the first pericyclic motion converter.

5. The transmission as defined in claim 4, further comprising a second pericyclic bearing positioned between an outer surface of second pericyclic motion converter and the inner surface of the carrier, the second pericyclic bearing positioned to provide a second nutating angle to the second pericyclic motion converter.

6. The transmission as defined in claim 1, wherein the first bearing comprises a first roller bearing to impart a wobble motion to the first pericyclic motion converter and a second roller bearing to react loads from a gear mesh of the first pericyclic motion converter to the output shaft.

7. The transmission as defined in claim 6, further comprising a first carrier positioned between the inner surface of the first pericyclic motion converter and the outer surface of the output shaft, wherein the first carrier supports the first roller bearing and second roller bearing between the first pericyclic motion converter and the output shaft.

8. The transmission as defined in claim 7, further comprising a first tether to operatively couple the first carrier to an input gear, the input gear to drive the first carrier via the first tether.

9. The transmission as defined in claim 8, wherein the second bearing comprises a third roller bearing to impart a wobble motion to the second pericyclic motion converter and a fourth roller bearing to react loads from a gear mesh of the second pericyclic motion converter to the output shaft.

10. The transmission as defined in claim 9, further comprising a second carrier positioned between gears of the second pericyclic motion converter and the outer surface of the output shaft, wherein the second carrier supports the third roller bearing and fourth roller bearing between the second pericyclic motion converter and the output shaft.

11. The transmission as defined in claim 10, further comprising a second tether to operatively couple the second carrier to the input gear, the input gear to drive the second carrier via the second tether.

12. The transmission as defined in claim 11, wherein the first and second tethers comprise a unitary structure.

13. A transmission comprising:
    a first pericyclic motion converter and a second pericyclic motion converter to drive an output shaft of a transmission, the first pericyclic motion converter including a ring-shaped gear having a first aperture defining a first inner surface and the second pericyclic motion converter including a ring-shaped gear having a second aperture defining a second inner surface, the first and second apertures to receive the output shaft of the transmission;
    a carrier to drive the first and second pericyclic motion converters;
    a first bearing positioned in the first aperture of the first pericyclic motion converter between an outer surface of the output shaft and the first inner surface of the first pericyclic motion converter; and
    a second bearing positioned in the second aperture of the second pericyclic motion converter between the outer surface of the output shaft and the second inner surface of the second pericyclic motion converter.

14. The transmission as defined in claim 13, wherein the first pericyclic motion converter includes a first gear face and a second gear face, the first gear face to engage a first reaction gear and the second gear face to engage a first output gear face of an output shaft gear coupled to the output shaft.

15. The transmission as defined in claim 14, wherein the second pericyclic motion converter includes a third gear face and a fourth gear face, the third gear face to engage a second reaction gear and the fourth gear face to engage a second output gear face of the output shaft gear coupled to the output shaft.

16. The transmission as defined in claim 15, wherein the first gear face faces away from the third gear face, and the second gear face faces toward the fourth gear face.

17. A transmission comprising:

a first pericyclic motion converter and a second pericyclic motion converter to drive an output shaft of a transmission, the first pericyclic motion converter including a first gear face and a second gear face, the first gear face to engage a first reaction gear and the second gear face to engage a first output gear face of an output shaft gear coupled to the output shaft;

the second pericyclic motion converter including a third gear face and a fourth gear face, the third gear face to engage a second reaction gear and the fourth gear face to engage a second output gear face of the output shaft gear coupled to the output shaft, the first gear face facing away from the third gear face, and the second gear face facing toward the fourth gear face, wherein, when the first pericyclic motion converter is at a first angle relative to a longitudinal axis of the output shaft, a first portion of the first gear face is to engage a first portion of the first reaction gear and a second portion of the first gear face is to disengage a second portion of the first reaction gear, and a first portion of the second gear face is to engage a first portion of the first output gear face and a second portion of the second gear face is to disengage a second portion of the first output gear face;

a carrier to drive the first and second pericyclic motion converters;

a first spherical bearing positioned between an outer surface of the output shaft and a first inner surface of a first opening of the first pericyclic motion converter; and a second spherical bearing positioned between the outer surface of the output shaft and a second inner surface of a second opening of the second pericyclic motion converter.

18. The transmission as defined in claim 17, wherein, when the second pericyclic motion converter is at a second angle relative to a longitudinal axis of the output shaft, a first portion of the third gear face is to engage a first portion of the second reaction gear and a second portion of the second gear face is to disengage a second portion of the second reaction gear, and a first portion of the fourth gear face is to engage a first portion of the second output gear face and a second portion of the fourth gear face is to disengage a second portion of the second output gear face.

19. The transmission as defined in claim 15, wherein the first gear face is oriented toward the third gear face, and the second gear face is oriented toward the fourth gear face.

20. The transmission as defined in claim 19, wherein a first portion of the first gear face of the first pericyclic motion converter engages a first portion of the first reaction gear at a first gear mesh, and a first portion of the third gear face of the second pericyclic motion converter engages a first portion of the second reaction gear at a second gear mesh.

21. The transmission as defined in claim 20, wherein the first gear mesh is aligned with the second gear mesh.

22. The transmission as defined in claim 19, wherein a first portion of the second gear face of the first pericyclic motion converter engages a first portion of the first output gear face at a third gear mesh, and a first portion of the fourth gear face of the second pericyclic motion converter engages a first portion of the second output gear at a fourth mesh.

23. The transmission as defined in claim 22, wherein the third gear mesh is aligned with the fourth gear mesh.

24. The transmission as defined in claim 13, wherein the first bearing or the second bearing includes at least one of a spherical bearing or a roller bearing.

* * * * *